United States Patent [19]

Kemp

[11] Patent Number: 4,516,921
[45] Date of Patent: May 14, 1985

[54] END SEALS FOR A ROTARY MACHINE

[75] Inventor: Gail W. Kemp, Dallas, Tex.

[73] Assignees: Vida M. Kemp, Dallas; Phyllis J. Carter, Richardson; Ruth E. Kemp, Dallas; Allan E. Kemp, Dallas, all of Tex.

[21] Appl. No.: 591,883

[22] Filed: Mar. 21, 1984

Related U.S. Application Data

[60] Continuation of Ser. No. 203,966, Nov. 4, 1980, abandoned, which is a division of Ser. No. 857,208, Dec. 5, 1977, Pat. No. 4,239,469, which is a continuation-in-part of Ser. No. 779,172, Mar. 18, 1977, abandoned, which is a continuation-in-part of Ser. No. 544,427, Jan. 27, 1975, Pat. No. 4,013,046.

[51] Int. Cl.³ ............................................. F01C 19/00
[52] U.S. Cl. .................................................... 418/141
[58] Field of Search ............................ 277/53, 56, 57; 418/131, 134, 135, 141

[56] References Cited

U.S. PATENT DOCUMENTS

| | | | |
|---|---|---|---|
| 2,098,652 | 11/1937 | Buckbee | 418/141 X |
| 2,211,447 | 8/1940 | Tumey | 418/141 |
| 2,349,838 | 5/1944 | Alexandersson et al. | 418/141 X |
| 2,766,928 | 10/1956 | Jandrassik | 418/134 X |
| 2,891,808 | 6/1959 | Richardson | 277/53 |
| 3,369,740 | 2/1968 | Abermeth | 418/141 X |

FOREIGN PATENT DOCUMENTS 721481  2/1943  Fed. Rep. of Germany ...... 418/141

Primary Examiner—Michael Koczo
Attorney, Agent, or Firm—Gerald G. Crutsinger; John F. Booth; Monty L. Ross

[57] ABSTRACT

An improved seal apparatus for a rotary machine including a rotary internal combustion engine. The machine generally comprises a rotor rotatably disposed in a circular working section in a hollow machine housing, a divider valve, and for an internal combustion engine a compression-expansion valve being rotatably secured in the housing and in sealing engagement with the rotor to divide the working space in the housing into an intake space and an exhaust space. The rotor of the machine has a piston formed thereon and the improved seal apparatus includes a plurality of seal bars in recesses between recessed connecting runners in the piston perimeter surface and urged into sealing relation with the inner wall of the housing. The seal bar ends and runner ends are restrained in the pistons such that the grille like surface of the seal assembly has a substantially continuous surface having sliding continuity to prevent the seal bars from catching on edges of the housing where the divider valve and compression expansion valve enter the working space of the machine. The seal bars and runners are angularly disposed relative to the edges of the valve housings to further reduce the possibility of the seal bars and runners from catching on these edges or the perimeter edges of the divider valve and compression-expansion valve. The seal bars and runners are radially restrained and are flexible to maximize sealing with the inner wall of the housing. The slipper seal assembly is used on rotary machines including internal combustion engines.

4 Claims, 35 Drawing Figures

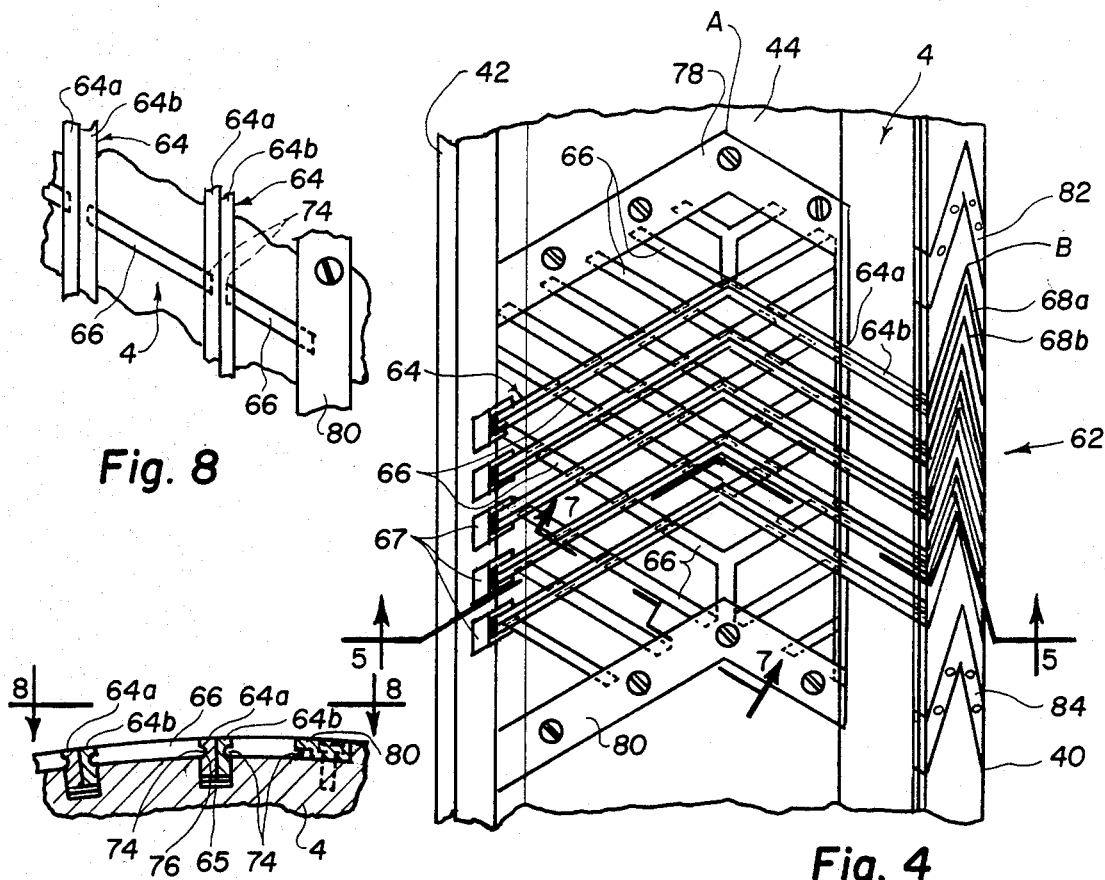
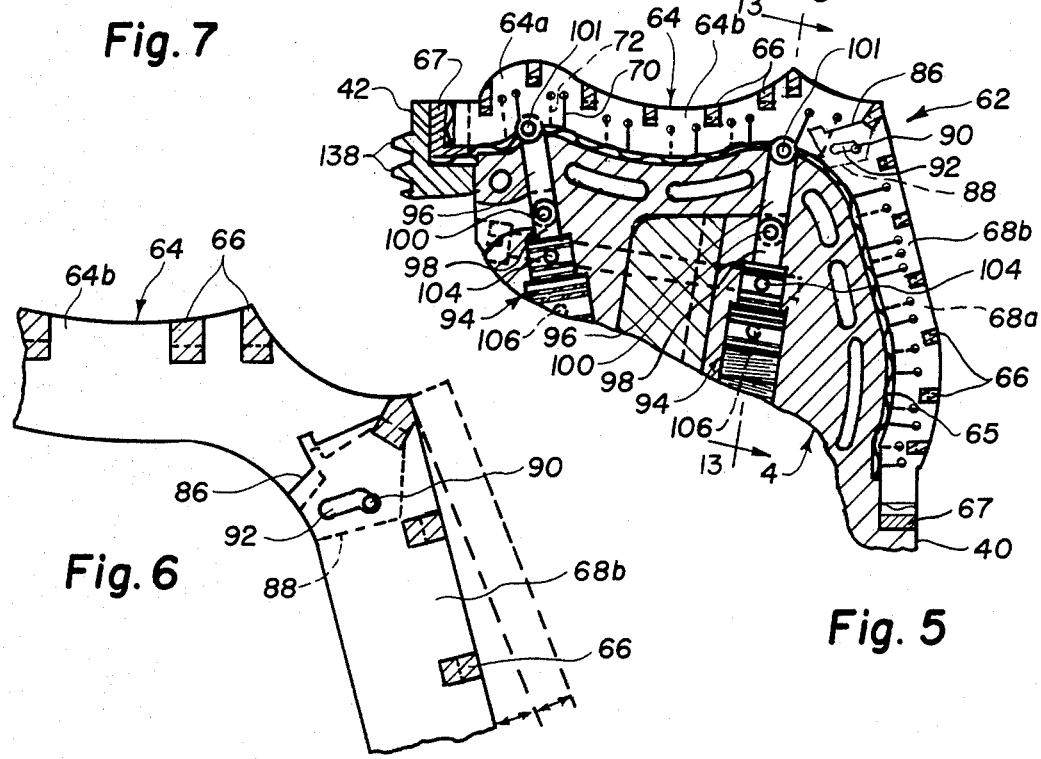

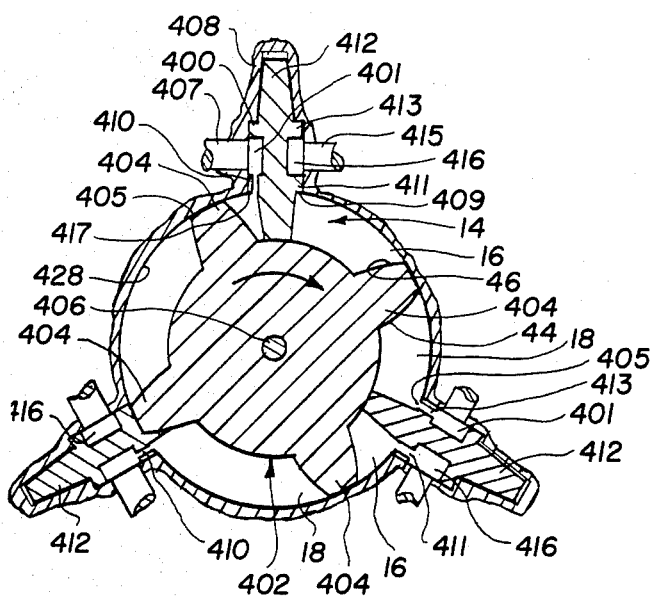
Fig. 26
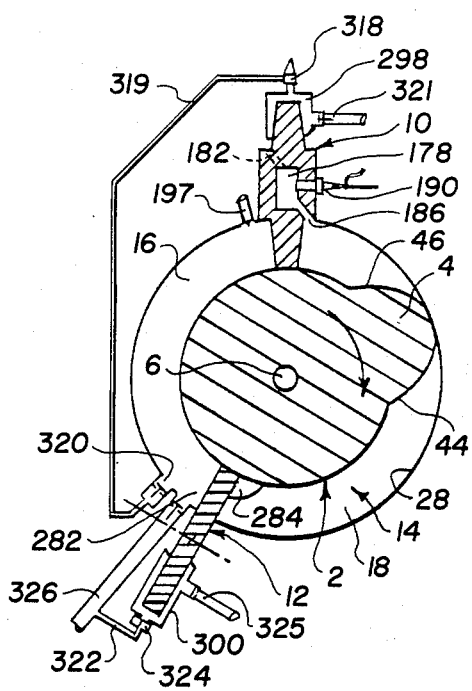
Fig. 19
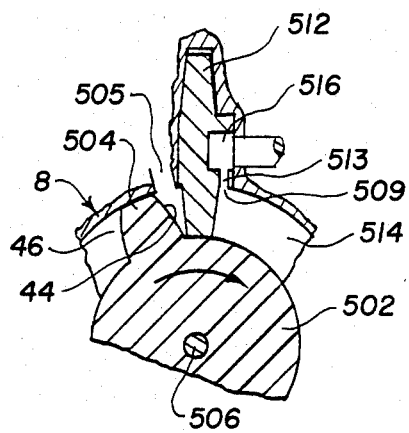
Fig. 27
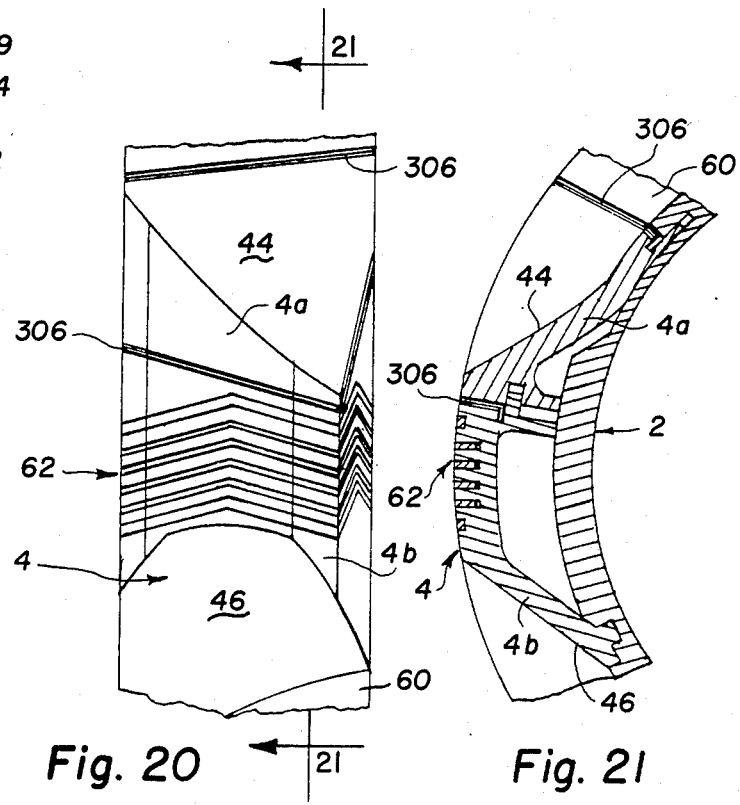
Fig. 20
Fig. 21

END SEALS FOR A ROTARY MACHINE

CROSS-REFERENCE TO RELATED APPLICATION

This application is a continuation of Ser. No. 203,966, filed Nov. 4, 1980, abandoned; which is a division of Ser. No. 857,208, filed Dec. 5, 1977, now U.S. Pat. No. 4,239,469; which is a continuation-in-part of Ser. No. 779,172, filed Mar. 18, 1977, abandoned; which is a continuation-in-part of Ser. No. 544,427, filed Jan. 27, 1975, now U.S. Pat. No. 4,013,046.

BACKGROUND OF THE INVENTION

It is well known in the art that the rotary engine and related rotary machines offer significant advantages over the reciprocating piston machines. Reduced vibration from reversing inertia forces due to the fact that the piston is revolving rather than reciprocating to turn the rotorshaft, reduced weight due to fewer moving parts, increased power due to the non-reciprocating action of the rotor and piston, decreased fuel consumption and reduced emission pollutants are a few such advantages.

However, one of the problems encountered with utilizing the rotary engine has been the difficulty in providing a satisfactory seal between the rotor and the engine housing. Because of the rotary motion of the engine, significant centrifugal forces are developed on the seals which must be overcome in order to develop maximum rotary engine efficiency. In addition, excessive wear is caused on the engine housing unless some method of overcoming the centrifugal forces is developed and a method provided to prevent seal systems from catching on potential places of interference in the surfaces against which the seal systems operate.

Significant problems are developed with lubricating oil flow to the rotor tip seals at the various operating rpm's. When all passages are correctly spaced and sized for idle and low rpm operations, excessive oil tends to be delivered at higher rpm's which tends to leak into the working section and cause excessive emissions of pollutants from the engine.

SUMMARY

I have devised an improved seal apparatus for rotary machines including a rotary engine utilizing a rotor in the shape of a truncated right body as generated by the arc of a circle with its center radially outward from and asymmetrical to the right end planes of the rotor and with a piston lobe formed on the outer circumference thereof. The rotor is positioned in a housing having a circular working space which is geometrically formed by the outer radius of the piston on the rotor.

The interior wall of the housing forms a fluid cycle working space for the machine. One or more divider valves are positioned in closures in the housing to define the ends of working cycle spaces and are located between an intake space and an exhaust or discharge space. The divider valve rotates and seals against the rotor and piston.

In a rotary engine, one or more rotating compression expansion valves are arranged in spaced relationship to the divider valves and rotate in sealing relationship with the rotor and piston. The compression-expansion valve divides the fluid working cycle space into an intake-compression space and an expansion-exhaust space. The rotating compression-expansion valve forms the combustion chamber for the engine. In an internal combustion engine configuration, the piston on the rotor rotates into the intake-compression space of the engine, drawing in a fresh charge of fluid behind the piston and forcing fluid ingested by the prior piston pass ahead of the piston from that space of the engine through the compression port into the combustion chamber of the compression-expansion valve. As the piston passes the valve, the valve is rotated to close the compression port and open the expansion port whereby the now burning gas and fuel mixture formed in the compression-expansion valve expands against the trailing face of the piston to turn the engine rotor shaft. At the same time the leading face of the piston forces residual gas from the prior expansion cycle out of the engine.

The compression-expansion valve is not a part of machines which are powered externally through the rotor shaft for use as a pump or compressor or for machines powered by fluid under pressure from an external source for use as a motor or engine. For a machine used as a pump or compressor the rotor powered by the rotor shaft rotates the piston into the working cycle space drawing in a fresh charge of fluid behind the piston and forcing fluid ingested by the last prior piston pass ahead of the piston and out through the discharge port of the machine. For a machine powered by pressurized fluid from an external source, the piston on the rotor rotates into the working cycle space and is rotated forward by pressurized fluid entering through the intake port behind the piston thus turning the rotor shaft to produce torque. The leading face of the piston forces residual fluid from the last piston pass out through the exhaust ports.

To seal the piston perimeter face against the engine housing wall, a unique arrangement of seal bars and runners are provided to be recessed into the perimeter face of the piston. The runners and seal bars are angularly disposed relative to the edges of the divider valve and compression-expansion valve housing. This allows the seal bars to pass the valve openings formed in the engine housing by allowing only a small portion of the seal to extend over the potentially obstructing edge of the opening at any one time.

A primary object of the invention is to provide a seal system which is a modified labyrinth type seal which is formed generally parallel to the direction of travel to provide a low friction seal between the side of the rotor and the housing.

Another object of the invention is to provide a seal for a rotary machine which minimizes wear due to rotary action between the machine housing and seal by controlling the outward centrifugal pressure of the seal against the housing.

It is still a further object of the invention to provide a rotary engine capable of utilizing a substantially higher percentage of fuel energy than can be achieved by engines now in use. The result is a substantial improvement in efficiency and therefore an engine of lighter weight to output ratio, improved fuel economy and reduced exhaust emission problems compared to presently produced internal combustion engines for use in the transportation field and other types of prime movers.

Other and further objects of the invention will become apparent upon studying the detailed description hereinafter following and the drawings annexed hereto.

DESCRIPTION OF THE DRAWINGS

Drawings of a preferred embodiment of the invention are annexed hereto so that the invention may be better and more fully understood, in which:

FIG. 4 is an elevational view of the slipper seal on the perimeter of the piston;

FIG. 5 is a cross-sectional view taken along line 5—5 of FIG. 4;

FIG. 6 is an enlarged elevational view of the joint in the seal bar;

FIG. 7 is a cross-sectional view taken along line 7—7 of FIG. 4;

FIG. 8 is a plan view of the inner section of the seal bar and runner taken along the plane line 8—8 of FIG. 7;

FIG. 19 is a diagrammatic end sectional view of a modified form of a rotary engine;

FIG. 20 is a diagrammatic view of a piston lobe adjustment means;

FIG. 21 is a cross-sectional view taken along line 21—21 of FIG. 20;

FIG. 26 is a diagrammatic view of a rotary machine suitable for use as a rotor shaft powered compressor or pump or a fluid powered motor or engine;

FIG. 27 is a diagrammatic view of a modified form of the divider valve illustrated in FIG. 26;

Numeral references are employed to designate like parts throughout the various figures of the drawing.

DESCRIPTION OF A PREFERRED EMBODIMENT

Figure 1:
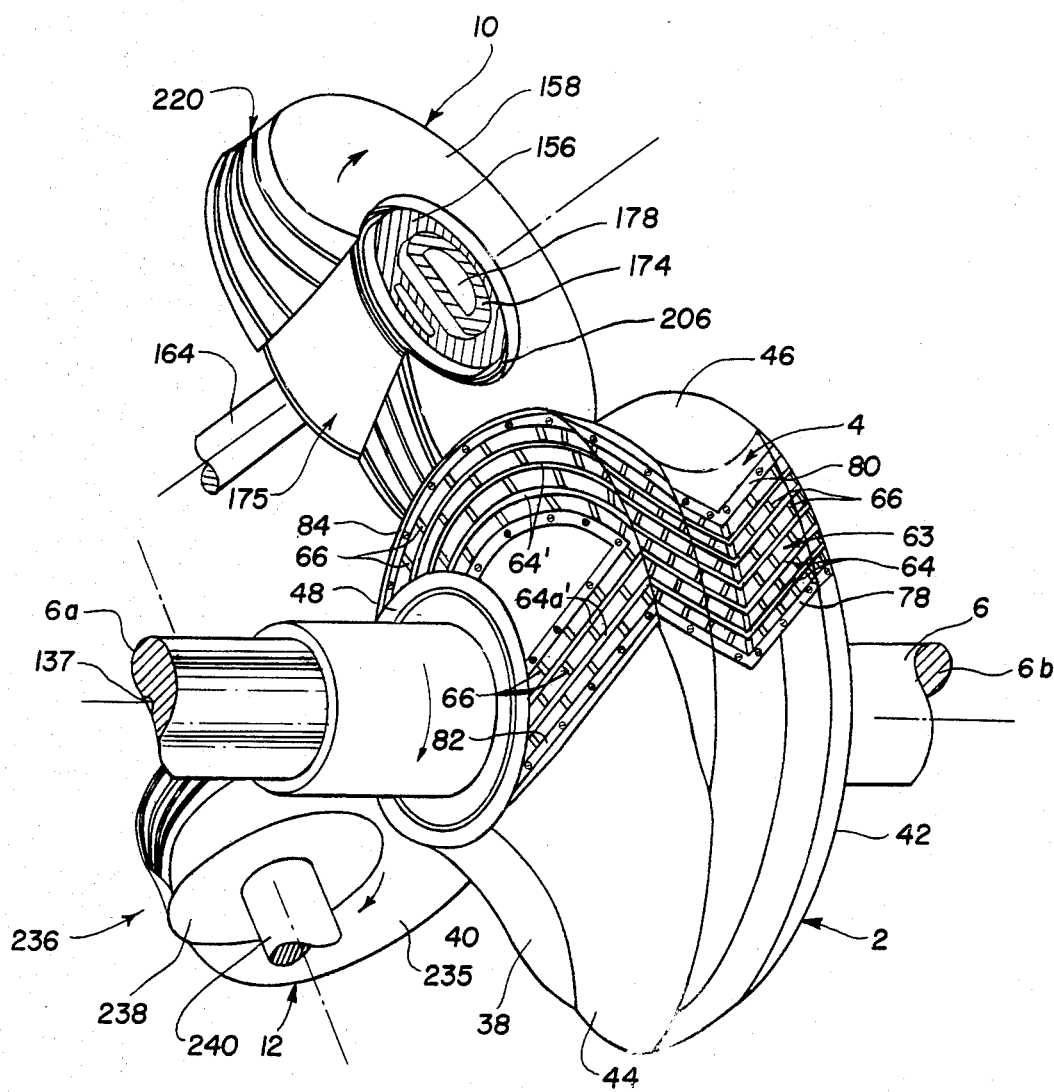
FIG. 1 is a diagrammatic perspective view of the rotor with the new seal apparatus, the compression-expansion valve and divider valve removed from the engine housing to more fully explain the cooperative relationships of the valves and rotor.
Figure 2:
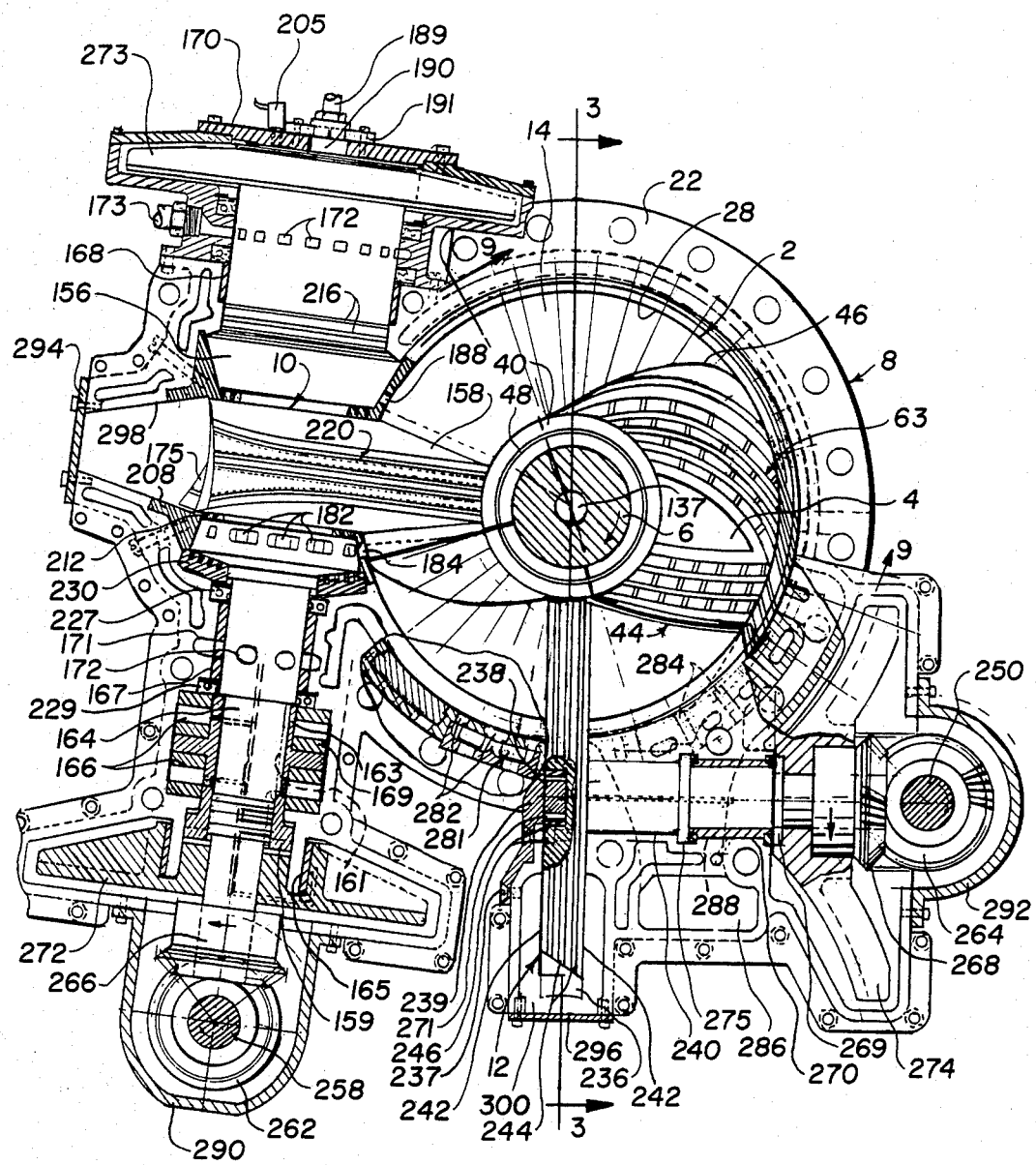
FIG. 2 is a cross-sectional view taken along a plane just above the rotor along line 2—2 of FIG. 3 with parts broken away to more clearly illustrate the details of construction.
Figure 3:
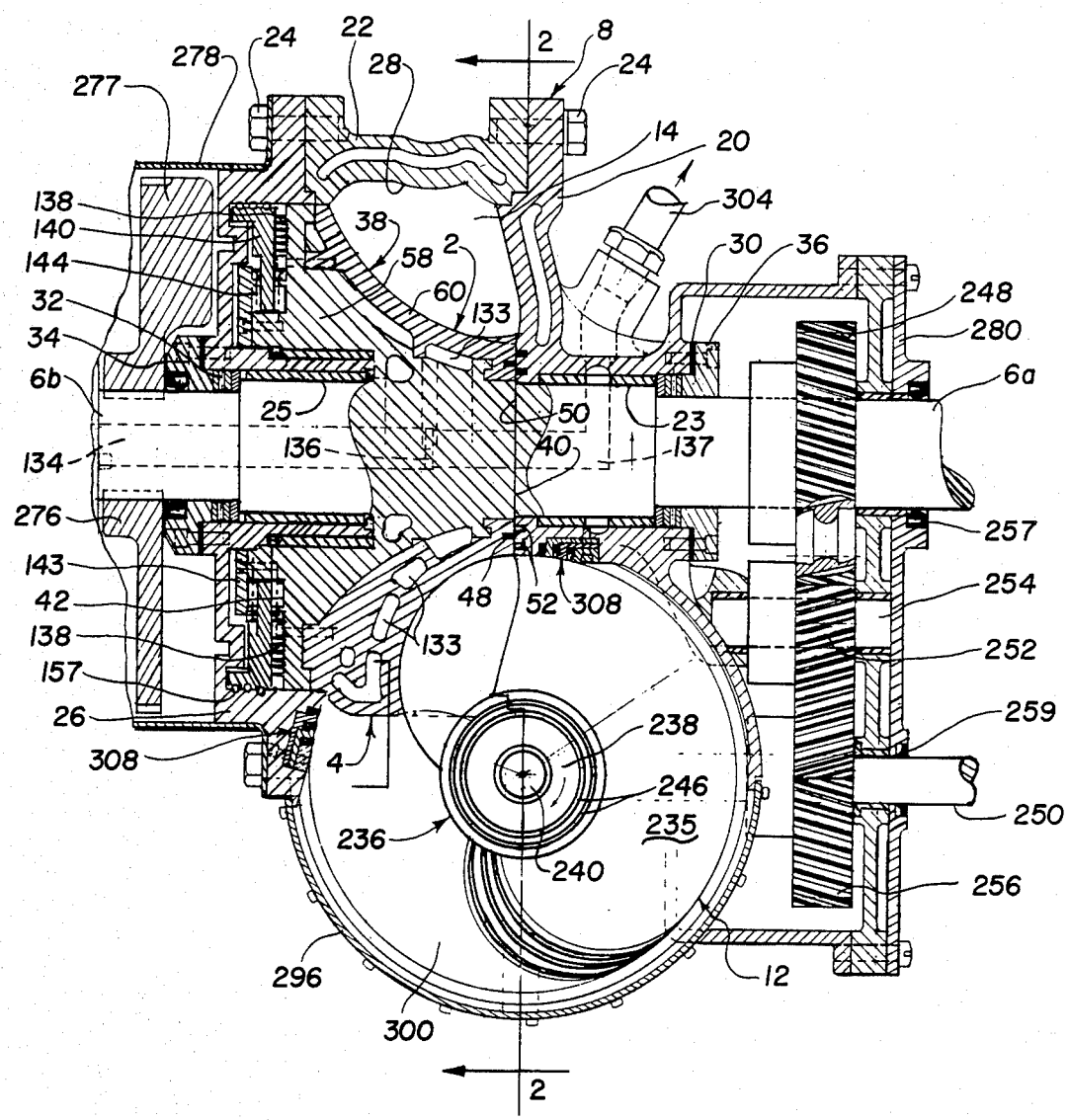
FIG. 3 is a cross-sectional view taken along line 3—3 of FIG. 2 with parts broken away to more clearly illustrate the details of construction.

Referring to FIGS. 1-3 of the drawings, the numeral 2 generally designates a rotor having a piston 4 thereon and rigidly secured to a shaft 6. The rotor 2 is rotatably disposed in a non-rotating machine housing generally designated by the numeral 8, which comprises several segments to be more fully explained hereinafter.

Suitable means such as a divider valve generally designated by the numeral 12 and for an internal combustion engine configuration as illustrated in FIGS. 1-3 a compression-expansion valve generally designated by the numeral 10, is suitably supported by means to be more fully explained hereinafter and rotate into sealing relationship with the rotor 2 to divide a working space 14. The divider valve 12 serves as the ends of the cycle working space 14. For a machine with one cycle working space 14, as illustrated in FIGS. 1-3, a single divider valve 12 serves as both ends of this working space and separates the intake area from the exhaust area of the space. For a machine with multiple working spaces 14 (FIG. 26) divider valve 412 separate adjacent working spaces 14 from each other. The divider valve disc 12 divides the cycle working space 14 (FIG. 19 and FIG. 26) into an intake space 16, between the divider valve 12 and the trailing face 46 of the piston 4 as the piston moves away from divider valve disc 12, and exhaust space 18, between the leading face 44 of piston 4 and the divider valve 12 as the piston 4 moves toward the divider valve disc 12. When the machine is used in an internal combustion engine configuration (FIG. 19) the compression-expansion valve disc 10 which is spaced from the divider valve disc 12 divides the working space 14 into an intake space 16 to act as an intake compression space and an exhaust space 18 to act as an expansion-exhaust space to be more fully explained hereinafter.

The housing 8 generally comprises a segment 20 and multiple part segment 22 which are secured together by suitable means such as bolts 24 to form the bulk of the housing 8. Segment 20 supports one end 6a of shaft 6 and segment 22 forms the outer wall of the working space 14. The end section 26 supports the other end 6b of shaft 6. These segments 20, 22 and 26 form the major components of housing 8 adjacent to working section 14. End 26 is secured by a suitable means such as bolts 24 to section 22 to allow assembly of the rotor 2 into the housing 8. The working section 14 is defined by the outer wall generally designated 28 formed by segmemts 20 and 22 of housing 8. Shaft 6 is supported by suitable means such as journal bearings 23 and 25 and thrust bearings 30 and 32 which are positioned behind bearing retainers 34 and 36 secured to housing segments 20 and 26 respectively.

The disclosure contained in U.S. Pat. No. 4,013,046 issued Mar. 22, 1977, is incorporated herein by reference in its entirety.

ROTOR

The rotor comprises a basic body arranged with at least one support means to support seal means between the rotor and the housing and a means for securing the rotor on a rotor shaft. As hereinafter described this basic rotor comprises several components, the major ones being the rotor body 38, piston 4 and liner 60, exclusive of seal means, lubrication means, related control means and other refinements. For a small machine it will be feasible to cast these components of body 38, piston 4 and liner 60 along with rotor shaft 6 as a single piece of casting.

As best illustrated in FIGS. 1-3, 19 and 26, the rotor 2 exclusive of piston 4 thereon generally comprises a circular shaped body 38 having a first surface 40 disposed against housing segment 20 and a second surface 42 disposed against housing segment 26.

Although it should be appreciated that multiple lobe piston rotors may be devised, for descriptive purposes a single lobe piston 4 is illustrated on body 38.

The ramped trailing face 46 of piston 4 may draw fluid into working space 14 or is forced forward by pressurized fluid in the space behind the piston 4 depending on the machine configuration and use. The ramped leading face 44 of piston 4 applies pressure to fluid in the working space 14 and expels fluid from this space.

At least one seal ring 48 is disposed in annular groove in surface 40 of rotor 2 to engage surface 50 of housing segment 20 and seal therewith. A spring is disposed in the groove to spring urge the seal ring 48 outwardly. Additional annular seal rings 52 are disposed in grooves in surface 50 adjacent opposite sides of seal ring 48 to engage surface 40 to maintain a seal therewith.

It should be readily apparent that these seal rings may be varied in number and may all be recessed in either or both surfaces 40 or 50. Also, it should be apparent that a labyrinth type seal may be used.

A preferred method of sealing each rotor end is illustrated for the large diameter end surface 42 of rotor 2 in FIGS. 9-12. A plurality of annular fins 138 are formed on facing member surface 42. The fins 138 engage a second facing member seal plate 140 which extends radially inwardly to engage spacing bearing 144 secured between rotor 2 and retainer 143 secured to rotor 2. Retainer 143 is adjustably positioned therein by means such as shims 145. Facing member seal plate 140 is held in a non-rotating position but adjustable position by means such as splines 147 in flange 140a which engages mating splines 147 in end section 26 of housing 8. The annular facing member seal plate 140 forms a bearing surface for fins 138 to seal against. Therefore, facing member seal plate 140 is moveable axially but is non-rotating and is spaced with respect to fins 138 and facing member surface 42 by means such as double thrust type spacing bearings 144. Means such as springs 142 may be utilized to urge the facing member seal place 140 against fins 138. The clearance between facing member surface 42, the fins 138 and facing member seal plate 140 is substantially constant even though the rotor 2 has slight movement in the housing 8 caused from end thrust on rotor 2.

Means to lubricate and remove contaminants from between fins 138 of the heretofore described rotor end seal (FIG. 9) may be provided by using fluid supply passage 146 and return passage 148 which comprises a plurality of small passages to the space 150 formed between the fins 138. Lubricating fluid passes through space 154a into passages 154 and into space 150 around fins 138. Small check valves 155 may be positioned in passages 154 to provide a check means during fluctuating pressure. Seal means such as rings 157 are positioned between flange 140a and end section 26 to seal space 154a. Passages 148 pass through sleeve 27, grooves 149 in the cylindrical part 153 of end section 26, and sleeve 27a to passage 148a which communicates with passage 137. The grooves 149 may be sized to regulate the flow of fluid through spaces around fins 138 and may limit this flow to intervals of the machines cycle when the cycle pressure is favorable.

The use of check valves 153 and the intermittent fluid flow control provided by the cylindrical gate valve action of grooves 149 in the cylindrical port 153 may be used to control working cycle pressure fluid leakage and short circuiting around fins 138 through passages 148 and 154 during the high pressure part of the machine cycle and lubricating fluid leakage to working section 14 during low pressure or vacuum phases of the cycle. The location and number of branch fluid passages 154 may be varied to best meet the application, similarly these passages acting as flow control orifices may be individually sized to best serve the particular seal fin or fins 138 to which the passage is directed. A fluid seal means (not shown) may be located radially outward from the outward most fin 138 to further reduce the possibility of fluid leakage from space around fins 138 into the machine cycle working space 14. It is readily apparent that a valving means may be used in the fluid supply passage 154 such as the cylindrical gate valve provided by grooves 149 in cylindrical port 153. The heretofore described seal and seal cleaning system is a modification of one type of a labyrinth seal system. It is readily apparent that modifications of other variations of labyrinth and related seal types including torque and groove restrictive sealing edges may be substituted in the heretofore described seal system and are considered a part of this description.

Figure 10:
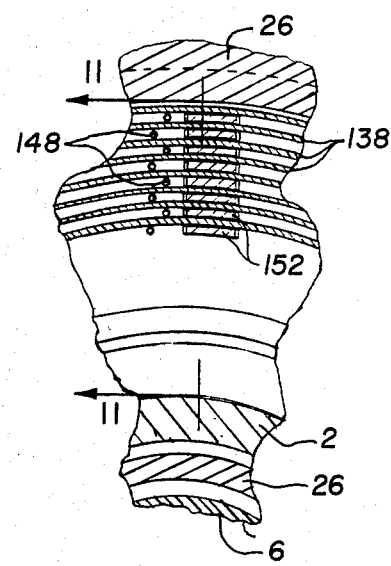
FIG. 10 is a cross-sectional view taken along line 10—10 of FIG. 9.
Figure 11:
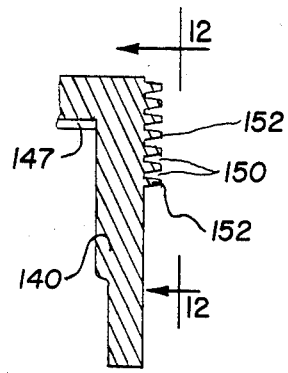
FIG. 11 is a cross-sectional view taken along line 11—11 of FIG. 10.
Figure 12:
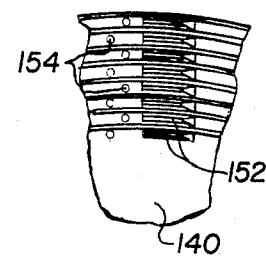
FIG. 12 is a cross-sectional view taken along the plane defined by line 12—12 in FIG. 11.

Means is preferrably provided to clean the grooves 150 between fins 138 comprises spaced teeth 152 which are best illustrated in FIGS. 10-12. These teeth 152 scrape any contaminants such as carbon, sludge or other foreign particles from the seal fins 138 such that they may properly perform their sealing function. A suitable quantity of lubricating fluid to lubricate the seal and flush out dislodged contaminants is supplied through passages 146, the plurality of passages 154 formed between fins 138, to grooves 150 and out through passages 148. The lubricant fluid is screened and filtered through suitable means (not shown) that are well known in the art of internal combustion engines and similar machines. The teeth 152 formed in facing member seal plate 140 may be positioned at a location in the machine cycle for best cleaning.

Figure 9:
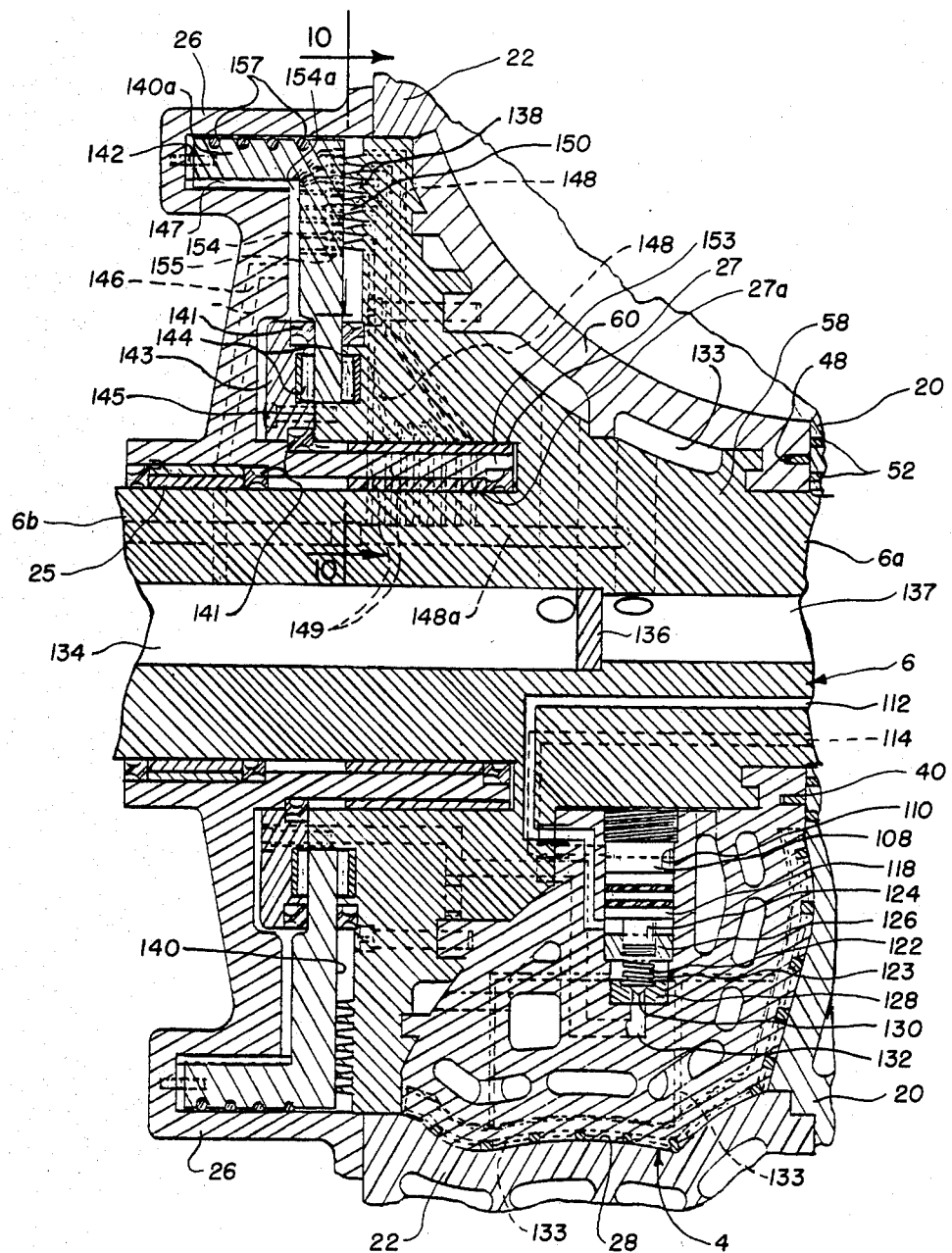
FIG. 9 is an enlarged cross-sectional view taken along line 9—9 of FIG. 2.

It should be readily apparent that facing member surface 140 and mating facing member surface 42 may be formed in shapes other than as shown in FIG. 9.

Figure 30:
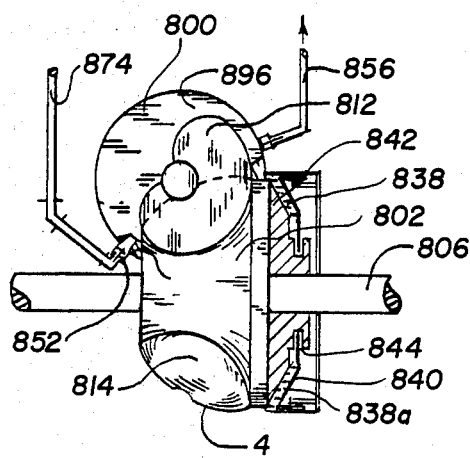
FIG. 30 is a diagrammatic view of a modified form of a rotary machine illustrated in FIG. 29.

As illustrated in FIG. 30 an alternate seal similar to that heretofore described has facing members 840 and 842 which are each in the shape of a frustum of a right circular cone and fins 838 and 838a are alternately attached to opposite facing members 840 and 842. This alternate attachment of fins 838 and 838a may also be used for fins 138 in the seal illustrated in FIG. 9 and heretofore described. Facing member 840 extends radially inward to engage a spacing means such as double thrust bearing 844 and is otherwise as heretofore described for the seal illustrated in FIG. 9.

Figure 31:
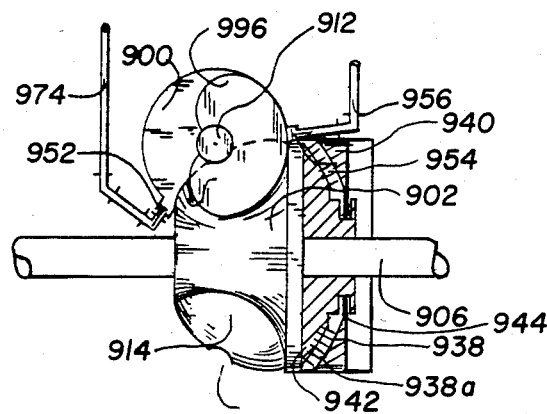
FIG. 31 is a diagrammatic view of a second modified form of a rotary machine illustrated in FIG. 29.

Illustrated in FIG. 31 is a second alternate seal in which facing members 940 and 942 are shaped as the frustum of a sphere. This seal has fins 938 and 938a attached to alternate facing members 940 and 942 and spacing means 944 all of which function as heretofore described in FIG. 9.

The seals illustrated in FIGS. 30 and 31 may be used where one of these arrangements is best suited in the available space. The seal illustrated in FIG. 31 has an advantage of being more tolerant to successful operation under conditions of somewhat greater rotor shaft bearing clearances or miss alignment.

The heretofore described seal cleaning and lubrication arrangements are equally applicable to the seals illustrated in FIGS. 9, 30 and 31.

It is also apparent that the seal alignment features of the seal system may be used without the seal cleaning system or vice-versa and the fluid system may be varied from that heretofore described. These various combinations and variations are included in the intent of this description. The above described modified labyrinth seal system is suitable for applications where a conventional labyrinth seal could not be satisfactorily used. This seal system retains most of the low friction characteristics which are a principal advantage of a labyrinth seal.

It is readily apparent that the heretofore described seal system is suitable for use on the opposite end of rotor 2 between rotor 2 and housing segment 20, especially in a machine with rotor 2 of larger relative diameter than the rotor shown in FIGS. 1–3. Also, that there are other applications not herein enumerated.

The rotor body 38 as shown in FIG. 3 comprises an inner portion 58 cast of metal and a liner 60 which may be of a special heat-wear resistant metal secured to the outer periphery of the body 38.

Piston 4 has a slipper seal assembly generally designated by numeral 52, which is recessed in the peripheral surface of piston 4 to engage the outer wall 28 of working space 14 to seal therewith. As best illustrated in FIGS. 4–8, the preferred slipper seal system 62 consists of a plurality of seal bars 64 and connected runners 66 angularly disposed to a plane normal to the direction of travel and which may be in a substantially diamond shaped pattern as best illustrated in FIG. 4. Each seal bar 64 is made up of at least two parallel pieces 64a, 64b, 68a and 68b recessed in individual grooves formed in the face of piston 4. Seal bars 64 as best illustrated in FIG. 5, have slits 70 or slits 72 extending from the inner side part way through each piece 64a, 64b, 68a and 68b of the seal bars 64 in a direction normal to the housing surface 28 and located at spaced intervals along each of the seal bar pieces to improve flexibility of the seal bars 64. Seal bar pieces 64a and 68a have slits 72 at spaced intervals from the similar slits 70 in seal bar piece 64b and 68b so that when the seal bar pieces as 64a and 64b are in place on the piston 4, one seal bar piece always seals the slots in the mating seal bar piece. The slits in seal bar pieces 68a and 68b are similarly arranged.

Resilient means such as springs 65 urge seal bars 64 outwardly to engage wall 28 of working space 14.

The body 38 as shown in FIG. 3 comprises an inner portion 58 case of metal and a liner 60 which may be of a special heat-wear resistant metal secured to the outer periphery of the body 38.

Piston 4 has a slipper seal assembly generally designated by numeral 62, which is recessed in the peripheral surface of piston 4 to engage the outer wall 28 of working space 24 to seal therewith. As best illustrated in FIGS. 4–8, the preferred slipper seal system 62 consists of a plurality of seal bars 64 and connecting runners 66 angularly disposed to a plane normal to the direction of travel and which may be in a substantially diamond shaped pattern as best illustrated in FIG. 4. Each seal bar 64 is made up of at least two parallel pieces 64a, 64b, 68a and 68b recessed in individual grooves in the face of piston 4. Seal bars 64b, as best illustrated in FIG. 5, have slits 70 extending from the inner side part way through each piece 64a, 64b, 68a and 68b of the seal bar 64 in a direction normal to the housing surface 28 and located at spaced intervals along each of the seal bar pieces to improve flexibility of the seal bar 64. Seal bar pieces 64a and 68a have slits 72 at spaced intervals from the similar slits 70 in seal bar piece 64b so that when the seal bar pieces as 64a and 64b are in place on the piston 4, one seal bar piece always seals the slots in the mating seal bar piece. The slits in seal bar pieces 68a and 68b are similarly arranged.

Resilient means such as springs 65 urge seal bars 64 outwardly to engage wall 28 of working space 14.

The adjacent radially outward surfaces of seal bars 64 and runners 66 are held in substantially continuous alignment by means as illustrated in FIGS. 7 and 8. The ends of runners 66 have protruding ledges 74 which extend into grooves 76 formed longitudinally of seal bars 64. Protruding ledge 74 is sufficiently long to allow for expansion and contraction and provides for radial movement inward and outward of seal bars 64 while substantially maintaining slipper seal 62 surface continuity. Seal bar pieces 64a and 64b and similar pieces 68a and 68b have a means of restraint to hold the top sealing surface of the parallel pieces in the same plane with respect to each other. This restraint means may be in part provided by clevis pins 101 if used or by indents or rivets. The runners 66 are assembled with seal bars 64 by sliding the protruding ledge 74 on the ends of runners 66 sideways into groove 76. During assembly of slipper seal 62 on piston 4 the runners 66 ledges 74 may be allowed to slide sideways in grooves 76 to facilitate the assembly operation. The slipper seal 62 comprised of the network of seal bars 64 and runners 66 has end clips 78, 80, 82 and 84 secured in recesses in the piston 4. Clips 78, 80, 82 and 84 secure the runners 66 and thus slipper seal 62 on the piston 4. Clips 78, 80, 82 and 84 are secured by means such as screws or the like. The clips form a surface flush with the surface of the adjoining piston surface but allow room for limited circumferential movement of the runners 66 to provide for expansion and contraction and limited radial movement in and out by seal bars 64. Seal bar pieces 64a, 64b, 68a and 68b have joints 86 and 88 formed therebetween and are pivotally secured by pin 90 which allows movement within slot 92 to allow flexible movement radially of the seal bars 64, as shown in dashed outline in FIG. 6 and which allows the seal to be assembled on piston 4 and into the network of slipper seal assembly 62. The shape of the seal bars 64 is such as to conform to the surface configuration of piston 4 and outer wall 28 of working space 14.

It is possible in some instances to use a single piece seal bar 64. When the piston surface configuration permits, the seal bars 64 may be a single piece of radial depth that will allow sufficient flexibility to both seal against surface 28 and to permit installation on piston 4 without slits 70 and 72 and joints 86 and 88. Means to align seal bars 64 with runners 66 comprises side grooves 76.

Seal bar pieces 64a, 64b, 68a and 68b are preferrably formed in the shape of an apex A and similar apex B respectively such that the seal bars 64 can pass openings in wall 28 and the notches of valve discs 10 and 12 at an angle and further reduce the possibility of interference therewith. The respective seal bars may be slightly rounded in sled runner fashion at the apexes A and B and elsewhere to further insure passage of slipper seal 62 without interference with potential obstructions.

It should be readily apparent that other types of seal systems would be useable such as those described in U.S. Pat. No. 4,013,046.

The ends of seal bars 64 and one end of a limited number of runners 66 terminate at the junction of the rotor 38 and housings 20 and 22. A U shaped extension 67 fits snugly and moveably on the ends of each such seal bar 64 and extends in a recess in piston 4 and/or the rim of rotor 38. The U-shaped extension 67 has a closed bottom under the U and is spring urged both against the end of the recess and the housing 20 or 22 to complete the end seal. The end of some runners 66 recessed in piston 4 and/or rotor 38 extends under the edge of the housing 20 or 22. The ends of the sealing faces of seal bars 64 terminate flush with the edges of housings 20 and 22.

The generally diamond shaped or herringbone configuration of the seal bars 64 and runners 66 position these items of the slipper seal assembly 62 angularly to the line of potential obstructions such that only a small portion of the seal bar 64 or runner 66 is disposed over potential lines of interference at an opening in the outer wall 28 of working space 14 at one time. This reduces the possibility of the seal or a portion thereof becoming snagged on the edge of the opening or a projection into the working space 15. The slipper seal assembly 62 provides a seal between piston 4 and housing 8 with provisions to prevent interference between the seal bar 64 and potential obstructions in the housing 8.

A modified form of the slipper seal assembly designated by the numeral 63 is illustrated in FIGS. 1 and 2 in which the seal bars 64' are curved on the side 40 of piston 4 such that they form an arc with the forward seal bar 64' substantially on the leading edge of piston 4 in the direction of travel and which accomplishes the same purpose as heretofore described. Seal bars 64a' and connecting runners 66 are angularly disposed to pass the openings in wall 28 at an angle to the edges of openings. Seal bars 64a' also on the side 40 of piston 4 are located with the trailing seal bar substantially on the trailing edge of piston 4. The seal bars 64 on the piston tip and other features of slipper seal 63 are as elsewhere described herein for slipper seal 62. It should be readily apparent that the number of seal bars 64, 64' and 64a' may vary both in number and location. Radially outward urging means such as springs are not shown for runners 66 but such means may be used. It should be apparent that piston 4 seal bar 64 sealing faces may have other than continuously parallel edges so long as the slipper assembly sliding surface continuity is maintained. Seal element surface edges may be relieved as in intermittent sections to reduce the sealing face area and thus reduce related urging pressure and friction in a modification of methods well known in the piston ring industry. When multiple parallel pieces are used in a common seal bar groove, such surface reduction may be in the form of relieved edges of the sides of seal bar pieces that bear against an adjacent seal bar piece. It is readily apparent that the heretofore described slipper seal assemblu may be used in slightly modified form as the seal means formed in the respective divider valve and compression-expansion valve housings to seal against the side of the respective valve discs adjacent to the opening to the working space housing.

Figure 13:
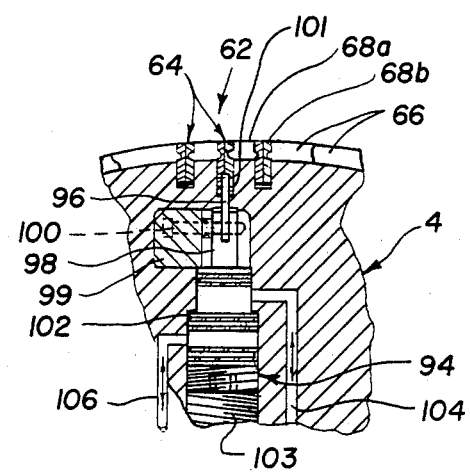
FIG. 13 is a cross-sectional view of the seal bar activation device taken along line 13—13 of FIG. 5.

Means to control the pressure on the slipper seal 62 comprises one or more activating cylinders generally designated by the numeral 94 and illustrated in FIG. 13.

One or more seal bars 64 are attached to an extension means 96 by means such as pin 101 which is in turn attached to clevis 98 by means such as pin 100. Extension 96 fits snugly but moveably in a hole in piston 4. To permit slight movement generally at right angles to extension 96 the hole for pin 101 is slightly elongated in this direction while providing substantial end play free action in a radial direction. The activating cylinder 94 is secured in a cavity formed in the piston 4 mounted radially inward and bearing on a shoulder 102 near the radially outward end of the cylinder cavity. The cylinder 94 is retained in the cylinder cavity by means such as threaded plug 103. Pin 100 is retained in position by means such as plug 99. Cylinder 94 is activated by fluid flow through fluid passages 104 and 106 from an external source. Cylinder 94 may be double acting and when supplied with control fluid through a modulating controller will provide modulating control pressure in either direction on seal bar 64. Cylinder 94 will normally be activated to provide a radially inward force to offset increases in seal 64 sealing pressure and friction resulting from increases in centrifugal forces on seal bar 64 as machine rpm increases as hereinafter described. When cylinder 94 is activated by pressure through passage 104 the cylinder 94 introduces a radially inward force on clevis 98 which moves the slipper seal assembly 62 radially inward against the outwardly urging springs 65 and centrifugal force that normally urges slipper seal assembly 62 radially outward. Fluid passes out through passage 106. It should be readily apparent that by controlling the fluid pressure on the activating cylinder 94 by a suitable fluid controller means programmed in relation to the engine speed, the added seal pressure from the centrifugal force at higher speeds can be nullified or controlled to optimum pressure.

Figure 14:
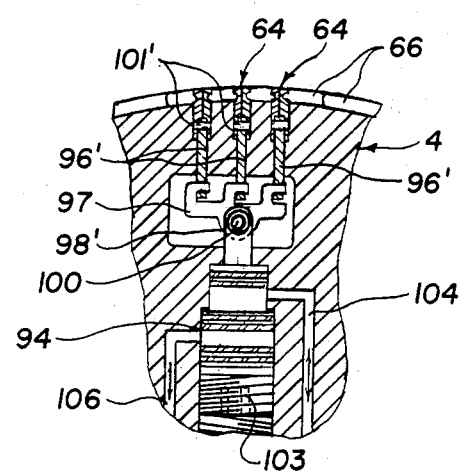
FIG. 14 is a modified form of the seal bar activation device similar to FIG. 13.

A modified form is illustrated in FIG. 14 wherein the clevis 98' is attached to several extensions 96' of seal bars 64 by means of connector member 97.

It should be readily apparent that other arrangements and pressure controlling means on the slipper seal assembly 62 may be devised.

Also formed in the piston 4 is an oil volume reducing means generally designated by the numeral 108 and illustrated in FIG. 9. When the oil passages are correctly spaced and sized for idle and low revolution operation excessive oil tends to be delivered at high speed revolutions. Excessive volume is caused by increased oil pressure generated by increasing centrifugal forces on the oil as the engine speed increases. One means of controlling excessive oil volume is illustrated in FIG. 9. Control fluid from the control source is routed on opposite ends of fluid control cylinder 110 through passages 112 and 114. Connecting sleeves join the passages between the piston 4 and main body 38 of the rotor 2. A piston 118 having seals 120 secured in grooves formed about the piston 118 is slideably disposed in cylinder 110. Piston 118 has needle valve 122 secured to stem 124 and arranged to be moved radially relative to shaft 6. Stem 124 has a seal 126 formed thereabout in cylinder 110 to prevent leakage of lubricating fluid past stem 124. A valve seat 128 is positioned such that the port 130 communicates with passage 132.

A spring 123 may be positioned between seat 128 and needle valve 122 to open port 130 in the event of no pressure such as at start up. Passage 132 communicates with a source of lubricating fluid from passage 134 in shaft 6 which communicates with a pressurized source of lubricating fluid not shown.

Lubricating fluid that is metered past needle valve 122 flows into distribution passages 133 for routing to appropriate locations in the seal bars 64 grooves and elsewhere to provide full or supplemental lubrication for slipper seal 62 and piston 4.

By increasing differential pressure on passage 114 over the pressure on passage 112, needle valve 122 is moved away from seat 128 to open port 130 to deliver more lubricating fluid to piston 4 and seal assembly 62 and vice versa.

The portion of cylinder 110 radially outward from seal 126 communicates with various passages 133 which communicate with the slipper seal system 62 on the face of piston 4 and to other locations where lubrication is required. This primarily lubricates the moving parts of the seal system 62. By modulating the fluid pressure on each end of the piston 118 one can control the position of the needle valve 122 to control the volume of lubricant flowing to the seal assembly 62 and elsewhere. Modulating pressure is controlled by the pressure within passages 112 and 114 by other means.

Figure 33:
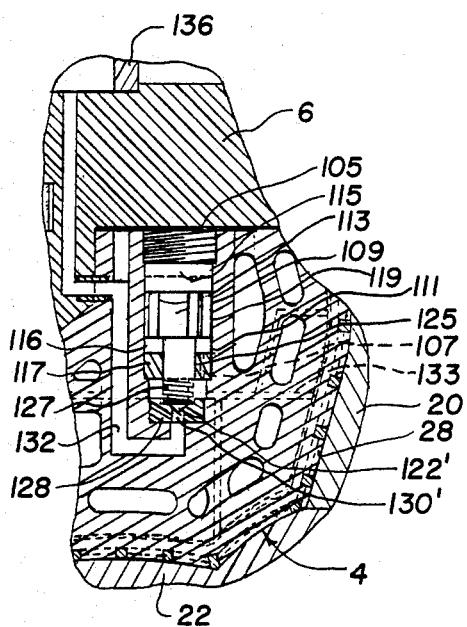
FIG. 33 is a cross-sectional view of a modified form of the lubricating fluid control as illustrated in FIG. 9.

An alternate means for controlling lubricating fluid volume to the slipper seal assembly 62 and piston 4 is generally designated by the numeral 109 and illustrated in FIG. 33. The lubricating fluid supply and distribution system including the needle valve flow controller and its location are substantially the same as heretofore described for lubricant fluid volume control means 109 (FIG. 9); therefore for the most part further description thereof is not repeated. A cylindrical weight 119 is slidably disposed in cylinder 111. Weight 119 has pressure equalization means such as grooves or other passages 113 to equalize pressure between end clearance spaces 115 and 116. Weight 119 has needle valve pin 122' secured to stem 125 and positioned to move radially relative to shaft 6. A needle valve seat 128' is positioned such that port 130' communicates between passage 132 and passage 133 when needle valve pin 122' is retracted out of seat 128'. A spring 127 may be positioned between seat 128' and needle valve 122' to open port 130' at times of low fluid pressure such as at start up. Guide 117 for stem 125 may have a relief passage 107 to permit passage of fluid to space 115. The radially inward end of cylinder 111 is closed by means such as screw plug 105. In operation, as rotor rpm increases, the centrifugal force on both the lubricating fluid and weight 119 increases. The weight moves radially outward with the increased rotor rpm and tends to counteract the combined fluid and spring pressure and thus to move needle valve pin 122' into port 130' to maintain a constant or predetermined lubricant flow to the piston 4 and seal system 62.

It should be readily apparent that other and further embodiments of a fluid control system may be devised without departing from the basic concept hereinbefore described.

As best illustrated in FIGS. 20–21, means for adjusting the circumferential length of the tip of piston 4 including piston ramped faces 44 and 46 on rotor 2 are provided to compensate for deviations of manufacturing tolerances and wear. The piston 4 is preferably made up of two pieces; a moveable piece 4a and permanently positioned piece 4b both secured to body 58 of rotor 2. Spacer means such as contoured shims 306 are positioned at the ends of piston piece 4a of piston 4 to adjust the circumferential position of piece 4a and thus lengthen or shorten the length of the piston 4 including piston ramped faces 44 and 46. Piston piece 4a includes the leading face 44 of piston 4 and the lead shim 306 is positioned between piston piece 4a and the end of rotor liner 60.

COMPRESSION-EXPANSION VALVE

Referring to FIGS. 2, 15–18 of the drawing, the compression-expansion valve 10 comprises a circular spooled shaped hub 156 and a disc-shaped body 158 which are formed of two primary segments 160 and 162 for assembly purposes. The compression-expansion valve 10 is part of a rotating assembly; other major features of this rotating assembly include drive shaft 164, drive gear 266, counter-weight 272 and 273, jacket 181, combustion chamber liner 174, seal system 220, glow plug 198 and may include a fuel injection nozzle 196. The rotating valve assembly is positioned in a cavity in the housing 8. The disc-shaped body 158 projects into the working space 14 of housing 8 through a passage formed in wall 28. The valve 10 assembly is supported by suitable means such as journal bearings 165, 167 and 168 secured in housing 8. Longitudinal movement is limited by means such as two way thrust bearings 166 acting on thrust flange 169 which is a part of thrust collar 163 which is secured to shaft 164. Cooling passages 172 are provided throughout valve 10 and provides for passage of suitable cooling means such as lubricant fluid which enters the assembly from supply channel 171 and leaves through return line 173 to form a coolant flow through the valve 10 in a manner well known in the art.

A notch 175 is formed in the disc-shaped body 158 to allow passage of piston 4 past the valve 10.

A heat resistant divided combustion chamber liner 174 has cavities formed therein to form the precombustion chamber 176 and main combustion chamber 178 separated by throat 177. The combustion chamber liner 174 is surrounded by jacket 181, insert 183 and hub 156. The combustion chamber liner 174 is secured in a fixed position with respect to rotating jacket 181 by means such as key 180 and screw pins 179. Insert 183 is secured to jacket 181 by means such as key pin 185 and screws 187. Insert 183 is secured to primary segment 162 by means such as screws 189. Combustion chamber liner 174 cannot rotate in insert 183 and primary segment 162 because of the outside shape of combustion chamber liner 174 at these locations. Also seal sleeves 193 in oil coolant passages 172 keep the respective adjacent pieces in alignment. Intake compression passages 182 are formed on the one end of combustion chamber 178 through the wall of liner 174 and each communicates once every revolution with inlet port 184 formed in non-rotating port member plate 208 which is attached to housing 8 and forms a part of wall 28 of working space 14. Expansion passages 186 are formed centrally of the liner 174 in combustion chamber 178 and each communicates once every revolution with port 188 formed in non-rotating expansion port plate member 210 on the opposite side of the compression-expansion valve disc 10 from inlet port 184. Means to supply fuel such as a fuel injector 196 is connected through disconnect fitting 192 to the rotating discharge end of a rotating to non-rotating seal fitting 190. The non-rotating end of fitting 190 is connected to fuel supply line 215. Rotating to non-rotating seal fitting 190 is secured to end plate 170 by retainer 191. Fitting 190 communicates with a connector 192 which connects to fuel injector 196. Fuel injector 196 is secured in place by means such as retainer 197 and communicates with the precombustion chamber 176.

A suitable ignition means such as glow plug 198 is positioned in precombustion chamber 176 and has an ignition circuit terminal 200 which is connected by means such as wire 201 to an annular ignition circuit terminal 202. Terminal 202 is insulated from and secured to rotating support ring 207 to which is secured rotating ignition terminal ring 203 by means such as screws. Rotating ring 203 contacts terminal means such as spring urged shoe 204 which is connected to a suitable ignition energy source.

Figure 34:
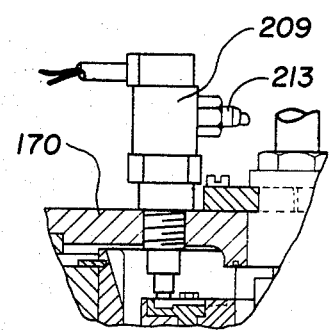
FIG. 34 is an enlarged sectional view of a fluid actuated ignition device similar to that illustrated in FIG. 15.

In the preferred arrangement terminal shoe 204 may be constructed with an actuator means 205 to move terminal shoe 204 from a position of no ignition circuit contact to a position of continuous contact with the rotating annular ring 203 and vice-versa. This means may be a linear action electrical solenoid 205 or a fluid actuator 209 as illustrated in FIG. 34. When an actuator means 205 or 209 is provided the shoe 204 need only complete an ignition energy contact with ring 203 for the relatively small percentage of engine operating time during which the heat from glow plug 198 is required to assist in starting a cold engine. Therefore the life of shoe 204 and annular contact ring 203 will be materially lengthened. The making and breaking of contact between shoe 204 and annular ring 203 may be used to make and break the energy supply to glow plug 198. However, the life of shoe 204 and ring 203 may be further lengthened by use of an energy circuit operating sequence for the actuator 205 or 209 in which the making or breaking of contact between shoe 204 and ring 203 is accomplished without the flow of energy through the connection.

Figure 35:
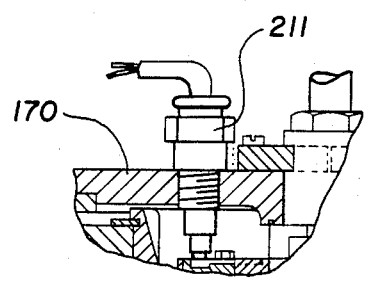
FIG. 35 is an enlarged sectional view of a continuous contact ignition device similar to that illustrated in FIG. 15.

A simple but less desirable arrangement eliminates the use of actuator 205 or 209. In this arrangement shoe 204 remains in continuous contact with ring 203 and is held in position by a holder 211 (FIG. 35) which is secured to end plate 170 by means such as screw threads. Control of the flow of energy through the ignition circuit is by a conventional means away from the compression expansion valve assembly.

Ignition current is supplied to glow plug 198 to preheat pre-combustion chamber 176 prior to starting the cold engine. As soon after starting as the temperature in pre-combustion chamber 176 is sufficient to maintain combustion and keep the engine running without the auxilary heat from glow plug 198, the energy to glow plug 198 is shut off.

Fluid actuator 209 is supplied with actuator fluid through fluid supply line 213 from a control means (not shown). Actuator 205 or 209 is secured in end plate 170 by means such as screw threads.

It should be readily apparent that fuel injected into precombustion chamber 176 when mixed with the air from passage 182 on a compression stroke will be ignited by the heat of compression augmented at start up by heat from glow plug 198. Thus, after piston 4 of rotor 2 passes the compression-expansion valve 10, expansion passages 186 will align with expansion port 188 to allow the expanding gas to expand against the trailing face 46 of piston 4 to push the rotor 2 about gas working space 14.

Figure 15:
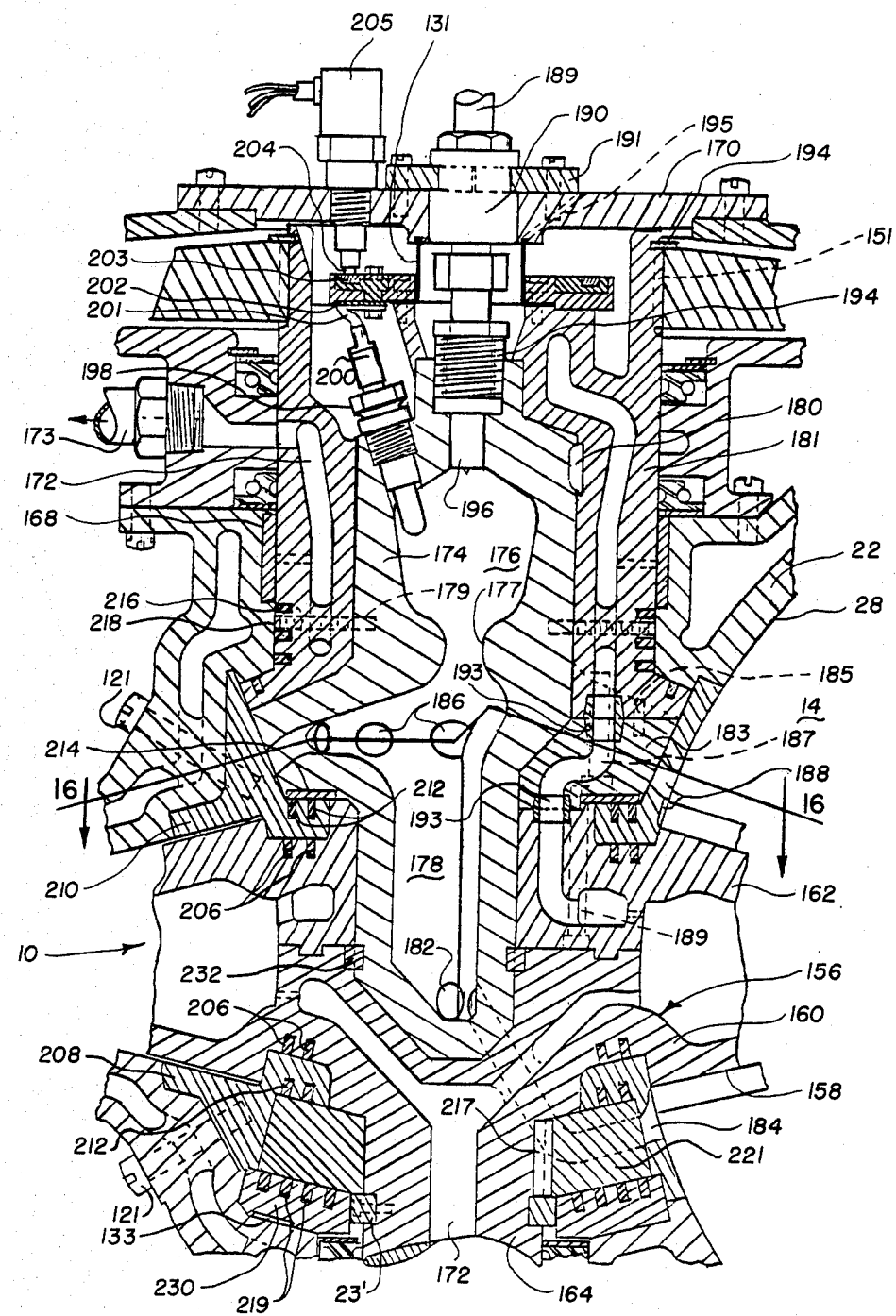
FIG. 15 is a partial cross-sectional view of the compression-expansion valve similar to that shown in FIG. 2.

Although several configurations of a compression-expansion valve 10 are possible one illustrated in FIG. 15 has various seals to prevent gas pressure losses through wall 28 and from around the hub 156. On the hub 156 annular seal rings 206 bear against non-rotating port member plate 208 and non-rotating exhaust port plate member 210. In addition, seal rings 212 on port plate members 210 and 208 bear against rotating heat shield bearing surface 214 and rotating port ring 221 respectively on each side of hub 156. Further, on jacket 181 seal rings 216 bear against the interior bore wall 218 formed in housing 8 which receives the compression-expansion valve 10 assembly.

Additional seal rings 219 are formed in an annular non-rotating retainer ring 230 and seal with rotating port ring 221 to complete the seal system between the rotating compression-expansion valve 10 assembly and housing 8. The heretofore described seal rings have an urging means which may be springs to cause the rings to complete the seal against the adjacent member.

The compression-expansion valve rotating assembly is fitted together by first inserting and securing combustion chamber liner 174 in jacket 181. With seal sleeves 193 and key pin 185 in place, insert 183 is fastened to jacket 181. Rotating heat shield bearing surface 214 is next secured to combustion chamber liner 174 and insert 183. Non-rotating expansion port plate 210 with seal rings 212 and seal bars 341 and 350 in place, is next placed around combustion chamber 174, followed by rotating primary segment 162 with seal rings 206 in place which is secured to segment 183 by means such as screws 189. Split collar 232 may now be secured around combustion chamber 174 by means such as screws. With seal rings 206 and valve disc 158 perimeter seal member 220 (FIGS. 17-18) in place, primary segment 160 is secured to primary segment 162 by means such as screws in disc 158. Non-rotating port member plate 208 with seal rings 212 is next placed around shaft 164 followed by rotating port ring 221 which is secured to shaft 164 by means such as key 217 and split collar 231 which in turn is secured by means such as screws. Non-rotating retainer ring 230 with seal rings 219 in place is next installed around shaft 164 followed by oil seals 227 and thrust collar 163 with thrust bearing assemblies 166. Thrust collar 163 is secured to shaft 164 by means such as key 161 and lock nut 159. With seal rings 216 in place the partial rotating assembly may be installed in split housing 8 and non-rotating port plate members 208 and 210 secured to housing 8 by means such as screws 121. Also retainer ring 230 is secured to housing 8 by means such as screws. With fuel injector 196 installed in precombustion chamber 176 rotating to non-rotating seal fitting 190 is attached by means of connector 192 to fuel injector 196. Terminal 200 is attached to glow plug 198 and rotating ring 203 is installed on jacket 181. The flange of baffle shield 131 may be installed under ring 203. Baffle shield 131 separates the fuel supply assembly area from the glow plug ignition system. Shield 131 may be slightly bell shaped at the outer end so that any fuel leakage will gravitate to this end and be slung off to drain out through means such as port 195 in end plate 170. The circular end of baffle shield 131 is recessed in a circular groove in end plate 170.

Figure 17:
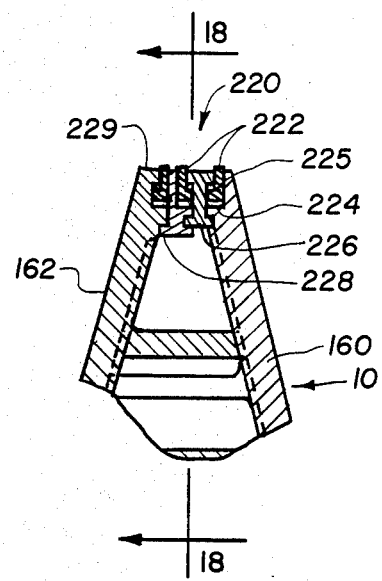
FIG. 17 is a cross-sectional view taken along line 17—17 of FIG. 16.
Figure 18:
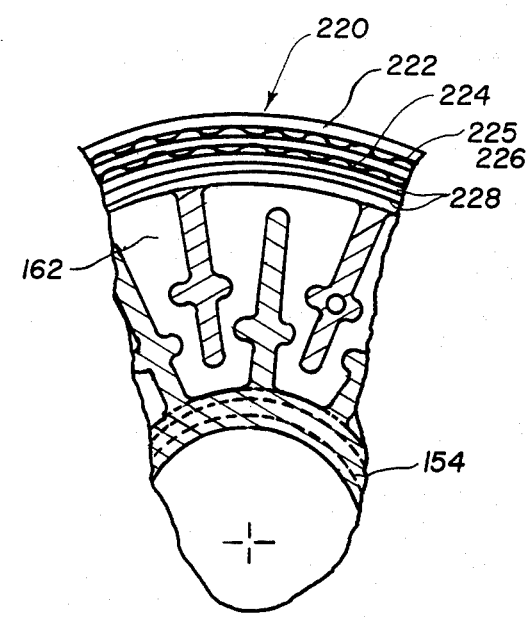
FIG. 18 is a cross-sectional view taken along line 18—18 of FIG. 17.

As best illustrated in FIGS. 17 and 18 the outer peripheral seal members generally designated by the numeral 220 comprise L-shaped seal bars 222 which are spring urged by springs 224 outwardly into engagement with the surface of rotor 2. Spring 225 is preferably of lighter tension and acts as a cushion or shock reducing spring that may be used to reduce possible breakage of seal bars 222.

Interlocking retaining pieces 226 and 228 retain the L-shaped seal bars 220 within the peripheral surface 229 of compression-expansion valve 10. The perimeter seal system of divider valve 12 may be substantially the same as the seal system for compression-expansion valve 10.

Figure 22:
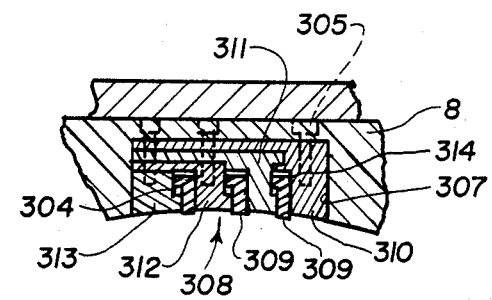
FIG. 22 is an enlarged view of a valve disc perimeter seal secured in the housing about the opening for valves as shown in FIG. 3.

As best illustrated in FIGS. 3 and 22 the valve housings 8 for compression-expansion valve 10 and divider valve 12 may be provided with seals 308 adjacent gas working space 14 to prevent leakage between the circular perimeter of surfaces 229 and 234 of the valve discs 158 and 235 respectively and housings 8. Seals 308 are located in recesses 307 in the ends of the seal slots through which the valves 10 and 12 move into and out from the gas working space 14 (FIG. 3). These seals 308 are best illustrated in FIG. 22 in which L-shaped seal bars 309 are interlocked with retaining pieces 310 and 311, 312 and 313 which are secured by suitable means to appropriate housing 8 sections to seal with the circular peripheral edges of the respective valves 10 and 12. Springs 314 urge the seal bars 309 outwardly.

Figure 16:
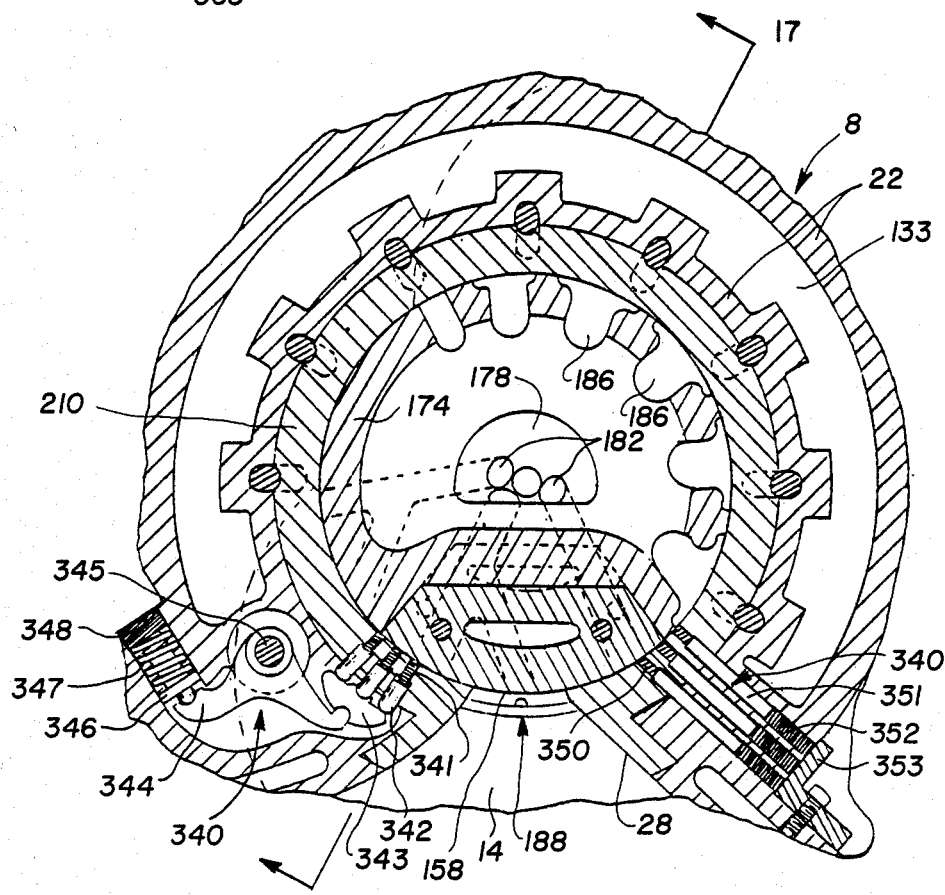
FIG. 16 is a cross-sectional view taken along line 16—16 of FIG. 15.

As best illustrated in FIG. 16 seals 340 may be used on the hubs 156 of valve 10. These seals prevent circumferential passage of fluid to or from working space 14 through the working clearance space between hubs 156 and housing 8. Seals 341 and 350 which are subject to direct contact with high temperature expanding fluids from the combustion chamber 178 are arranged with the urging tension means which may be springs 352 and 347 located remotely from the seal bars 341 and 350. One side of hub 156 has seal bars 341 urged by rods 342 into sealing relationship with the circumferential perimeter of hub 156. Rods 342 are urged inwardly by multiple actuator member 343. Member 343 is urged inwardly by rocker arm 344 pivotally secured on pin 345 and urged about pin 345 by plunger 346 spring urged by spring 347. Screw 348 acts as a back retainer for spring 347 and may be used for adjustment of tension on spring 347. On the opposite side of port 188, seal bars 350 are similarly urged inwardly by springs 352 acting through push rods 351 and held in place by retainer 353. While described for the hub on the expansion side of compression-expansion valve 10, like seals are provided on the hub on the opposite side of valve 10 and may be used on both hubs of a divider valve 12 where projecting hubs are a part of this valve (FIGS. 26 and 27).

It is readily apparent that other seal urging arrangements may be used to urge seal means such as seals 341 and 350 into sealing engagement with valve hub 156 and similar hubs. Also it is apparent that either of the urging linkage arrangements shown may be used in some machines both for seal bars 341 and 350. For machines in which valve hub operating temperature conditions are materially lower than for the hub of an internal combustion engine the seal bars similar to bars 341 and 350 may have the urging means such as spring bearing directly on the seal bar with out use of at least some of the items such as push rods, plungers, multiple actuators, rocker arms and pivot pins. These other arrangements are considered to be a part of this description.

The rotation of compression-expansion valves 10 and divider valves 12 in their respective housings 8 external to the working space 14 tends to create a pumping action within the chambers formed by those housings. Means to control and best utilize the fluid pressure within these chambers to improve the operation of the machine in some representative types of service are illustrated in FIGS. 19 and 28–31. This controlled valve chamber pressure may in part be utilized to minimize possible leakage of fluid between the working space 14 and the respective valve chambers.

As best illustrated in schematic FIG. 19 of an internal combustion engine a means of compression-expansion valve 10 chamber 298 fluid pressure control includes fluid inlet from an external source (not shown) through an inlet pressure control valve 321 to chamber 298. Discharge from chamber 298 is through optional pressure control valve 318 and passage 319 to a valve means 320 which connects to the intake compression area 16 of working space 14. For divider valve 12 chamber 300 fluid inlet from an external source (not shown) is through pressure control valve 325. Pressure discharge from chamber 300 is through pressure control valve 324 and passage 322 which connects to intake means 326. Fluid from chamber 300 is ingested into intake compression area 16 through intake valve 282. It is readily apparent that passage 319 from chamber 298 may also be connected to intake manifold 326 instead of to intake-compression area 16 through check valve 320.

DIVIDER VALVE

As best illustrated in FIGS. 2 and 3, the divider valve comprises a disc-shaped valve having a notch 236 formed therein. The divider valve 12 has a hub 238 secured to rotating shaft 240 and, as illustrated in a preferred embodiment, may have straight parallel sides 242. L-shaped seal bars 244, similar to those on the compression-expansion valve 10 and illustrated in FIG. 17, may be secured to the periphery of divider valve 12 to seal with the rotor 2 and piston 4. The notch 236 provides an opening for the piston 4 to pass therethrough as it rotates about shaft 6. Seal rings 246 are formed in the side of hub 238 to form a seal with housing 8.

Suitable timing means is provided to drive the divider valve 12 and compression-expansion valve 10. One such means to drive divider valve 12 has a driving gear 248 rigidly secured to shaft 6 at end 6a which is drivingly connected to shaft 250 by idler gear 252 rotatably secured on the shaft 254 and driven gear 256 rigidly secured to shaft 250. Shaft 250 is connected by a suitable means such as miter gears 264 and 268 or the like to shaft 240 which are drivingly connected to the divider valve 12. Miter gear 264 is rigidly connected to shaft 250 and miter gear 268 is so connected to shaft 240. The drive means to compression-expansion valve 10 is similar and may also be driven by gear 248.

Shaft 240 and divider valve 12 are suitably supported by bearing means such as bearings 270 and 271. Bearing 270 located in housing 8 may be a combination journal and thrust bearing located on shaft 240 between thrust flanges 269 and 275. Bearing 271 may be located in the end of shaft 240 which may also be in the hub 238 of divider valve 12. Bearing 271 may be supported on hanger 239 which is secured to housing 8 by means such as screws 237.

For smoother operation counterweights 272, 273 and 274 are suitably secured to shaft 164 and 240 of compression-expansion valve 10 and divider valve 12 respectively, to compensate for the notches 175 and 236 formed in each valve disc.

In addition, a fly wheel 276 is suitably secured near end 6b of shaft 6 and has a weighted part 277 opposite piston 4 on rotor 2. A suitable housing 278 is provided to allow connection of a transmission (not shown) without foreign particles entering the seals about dust cover 34. Likewise, a suitable dust cover 280 is provided on end 6a of shaft 6 and which may support shaft seals 257 and 259.

Intake means such as ports 282 with valve means 281 are formed adjacent to the divider valve 12 in the wall 28 of working space 14 to communicate with working space 14. An engine operating cycle begins as the trailing face 46 of piston 4 passes divider valve 12 and fluid, which may be air, is drawn by the partial vacuum into the working space 14 between divider valve 12 and compression-expansion valve 10. On the next revolution the leading face 44 of piston 4 compresses that fluid into the combustion chamber 174 though intake port 184 and compression passages 182.

As substantially all of the fluid is compressed through intake port 184 the compression-expansion valve rotates to close intake port 184, fuel is injected into the combustion chamber 176 and combustion is initiated. At the same time piston 4 has passed through notch 175 in compression-expansion valve 10. By the time the trailing face 46 clears the compression-expansion valve 10 this valve has rotated to open expansion port 188 in wall 28 allowing the high pressure burning and expanding gases from combustion to flow through passages 186 and expansion port 188 into the still small volume space 18 being formed between compression-expansion valve 10 and the trailing face 46 of piston 4. These high pressure gases acting against trailing face 46 forces piston 4 forward thus rotating rotor 2 and output shaft 6 to produce torque.

Exhaust ports 284 are formed in the outer wall 28 of working space 14 and communicate with exhaust outlet 286 through passage 288 formed in housing 8. As piston 4 passes ports 284 the opened ports allow most of the substantially expanded gases in space 18 to leave the engine through ports 284 and associated exhaust outlet 286. On the next pass of piston 4 the leading face 44 expells the remaining residual gases from space 18 through ports 284 to complete an engine operating cycle.

Suitable dust covers 290, 292 cover and protect shafts 258 and 250 of the drive system for compression-expansion valves 10 and divider valve 12. Suitable dust covers 294 and 296 cover the gap over the chambers 298 and 300 formed between the compression-expansion valve 10 and divider valve 12 and their respective housings 8.

Suitable lubricant pressure means is connected to an inlet passage (not shown) to passage 134 and outlet passage line 303 for providing lubricant under pressure to the various hereinbefore described devices.

Cooling is provided by a combination of lubricant fluid flow through passages in rotor 2 and the compression-expansion valve 10 assembly and water based fluids through jackets formed in housing 8. Rotor 2 is preferably cooled by the passage of lubricant through passages formed therein which is well known in the art and further description is not deemed necessary, however, reference is made to U.S. Pat. No. 4,013,046 for further description thereof.

Suitable cooling passages are formed in the housing 8 to provide for cooling in the method well known in the art. It is readily apparent that the housing 8 can be provided with cooling fins in lieu of liquid fluid coolant passages so that the housing may be air cooled. In the air cooled configuration a blower or fan and suitable air duct arrangement may be used to increase the efficiency of the cooling system.

An alternate internal combustion engine arrangement is best illustrated in schematic FIG. 19. In this arrangement a fluid, normally air, is ingested into the intake compression space 16 and during compression, fuel is also injected into this space. The fluid-fuel mixture is compressed into the combustion chamber and ignited by means such as a spark plug. The expansion and exhaust phases of the cycle are as heretofore described. Fluid is ingested from intake means 326 through valved port 282 into working area 14 intake compression space 16 behind trailing face 46 of piston 4 and thus filling space 16 with fluid. On the next piston 4 pass the leading face 44 of the piston compresses the fluid through passages 182 into combustion chamber 178. As this compression is occuring fuel is injected through fuel injector nozzle 197 into space 16 ahead of piston 4 to mix with the fluid being compressed. As the piston 4 passes through compression-expansion valve 10 substantially all of the fluid-fuel mixture has been compressed into passages 182 and combustion chamber 178 where it is ignited by means such as spark plug 199 connected to a conventional ignition system (not shown). Expansion is through passages 186 to expansion exhaust space 18 to act on the trailing face 46 of piston 4 as heretofore described. Exhaust is through ports 284 also as heretofore described.

The fluid source to the intake compression space of the heretofore described engines may be furnished at a pressure above atmospheric or may be furnished at substantially atmospheric pressure. Above atmospheric pressure may be provided by any of the several pressurizing or super charging means known to the art such as a turbo supercharger. The use of pressurized fluid to the engine intake means is preferred for engines which fuel is injected directly into the combustion chamber.

Figure 23:
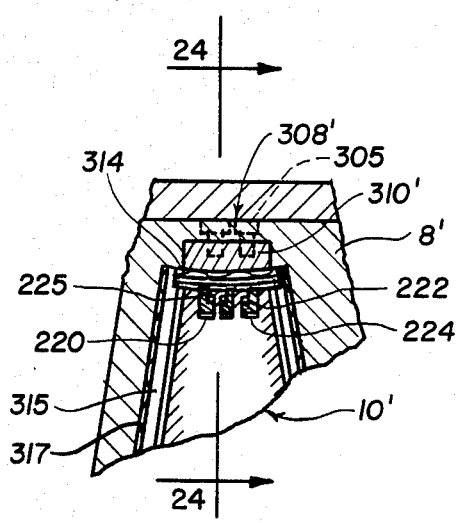
FIG. 23 is a modified form of the valve seal illustrated in FIG. 22.
Figure 24:
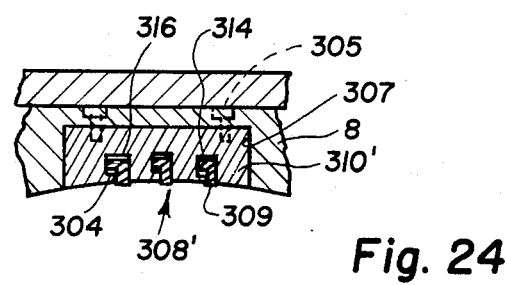
FIG. 24 is a cross-sectional view taken along line 24—24 of FIG. 23.

Alternate forms of seal 308 adjacent to the valve chambers 298 and 300 opening into the gas working space 14 (FIG. 3) are illustrated in FIGS. 23 and 24 and generally designated 308'. Seal 308' has a single retaining piece 310' and L-shaped bars 309 spring urged outwardly by spring 314. The L-shaped bars 309 are positioned in grooves 316 formed in retaining piece 310' and then inserted in a recess 307 in the housing 8 and secured thereto by means such as screws 305. Semi schematic FIG. 23 shows the general relationship between seal 308', compression-expansion valve disc 10, circular perimeter seals 220, and side of disc 10 "L" shaped seals 315 with urgng springs 317.

L-shaped bars 309 are spring urged by springs 314 against the compression-expansion valve disc seals 220. Side bars 315 are spring urged outwardly by spring 317 against the sides of valve 10. The sealing relationship between seal 308 and the circular perimeter of valve 10 is essentially the same as illustrated in FIG. 24 for seal 308'.

Figure 25:
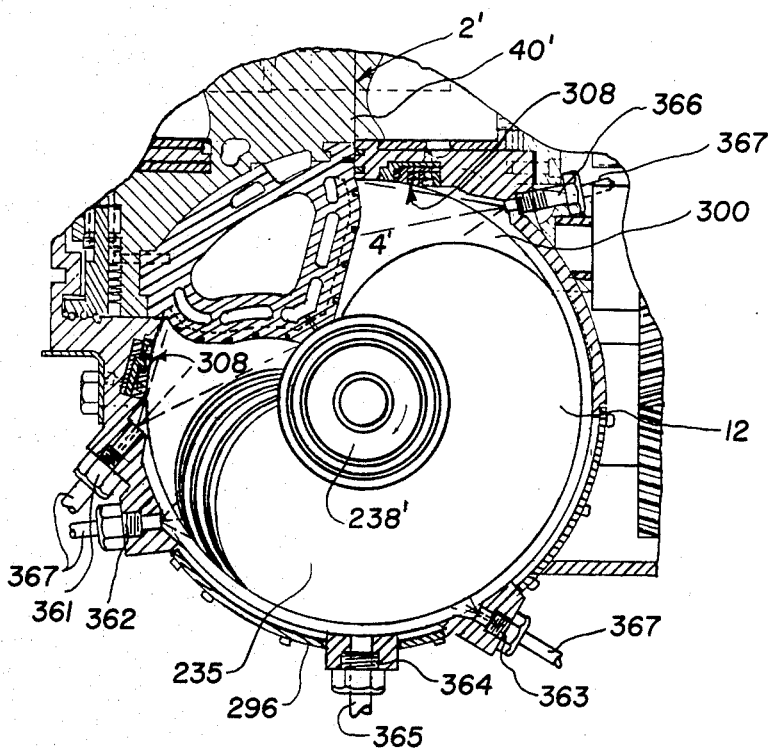
FIG. 25 is a cross-sectional view showing a modified lubrication system.

As illustrated in FIG. 25 an alternate method of lubrication for piston 4 with slipper seal 62 thereon and discs of compression-expansion valve 10 and divider valve 12 with their respective seal means uses lubricant spray means located in at least one of the housings 8 of valves 10 and 12 as the primary lubrication source for these elements. Since the lubrication spray means are substantially the same for housings 8 of compression-expansion valve 10 and divider valve 12, the arrangement for divider valve 12, as illustrated in FIG. 25, is substantially the same for valve 10. Lubricant from a suitable source such as a pump (not shown) is supplied through lubricant supply lines 367 to lubricant spray means such as nozzles 361, 362, 363 and 366. These spray means are positioned to direct the impingement of lubricant fluid against and coat piston 4 and divider valve 12 along with their respective seals. Spray means such as nozzles 361 and 366 direct lubricant against piston 4 through the valve opening in surface 28 as the piston 4 passes through divider valve 12. Spray means such as nozzles 362 and 363 direct lubricant against divider valve 12 disc and seals. It is readily apparent that the number and location of spray means such as nozzles 361–363 and 366 may be varied from that shown in FIG. 25. At least one lubricant orifice 360 connected to the piston coolant-lubricant system may be formed in the tip of piston 4 to lubricate the piston surface which is in continuous contact with housing 8, hub 156 or hub 238 and cannot receive directly sprayed lubricant from a lubricant spray means such as nozzles 361 or 366.

For machines without a compression-expansion valve 10, the necessary lubrication for piston 4 and seals system 62 is supplied from nozzles in the divider valve 12 housing and the lubrication is otherwise accomplished as heretofore described.

A sump means such as collector 364 allows the excess lubricant over spray to flow by gravity to the lower portion of valve chamber 300 and is connected by a drain line 365 for return to the pump means.

FIG. 26 diagrammatically illustrates a machine which is powered from an external source for a pressurized fluid such as steam for use as a prime mover. The device can also be used as a pump or compressor. Three divider valves 412 seal against rotor 402 with four pistons 404 which seal against circular wall 428. Divider valves 412 have ported cylindrical cups 400 and 411 on opposite sides of the valve disc which function in conjunction with the housing 408 as positive acting valves, upon rotation of divider valve 412. Pressurized fluid is supplied through an intake manifold connecting to a passage 415 in housing 408 which terminates at the open end of cup space 416. When cylindrical cup 411 has rotated in housing 408 to align at least one of the ports 413 in cup 411 with passages 409 in outer wall 428 of housing 408, fluid is admitted to working space 14. This fluid flow continues until cup 411 rotates to a position where none of ports 413 are aligned with passage 409. Similarly, the exhaust or discharge cylindrical cup valve 400 has ports 410 which function substantially as heretofore described for inlet cylindrical cup 411 and which control the exhaust or discharge of fluid through passage 417. Fluid such as steam or another pressurized medium is delivered under pressure to cylindrical cups 411, and as a piston 404 moves past passage 409, port 413 communicates with working section 14 through passage 409 to admit fluid into the space 14 between divider valve 412 and the trailing face 46 of piston 404 so that piston 404 is forced to move and turn shaft 406.

When the pressurized fluid is an expandable fluid such as steam, the positive inlet valve action provided by the cylindrical cup 411 rotating in housing 408 provides a means of cutting off the fluid supply before the piston 404 has completed its travel through space 14 to the exhaust location. Thus, the fluid in the working space 14 may expand to provide additional torque and therefore increased machine efficiency. The use of positive acting exhaust and/or discharge valves permits more complete utilization of working space 14 than may be possible with open ports at these locations. Spent fluid is exhausted through passage 417 and ports 410 and space 416 in cylinder cup 400 by the leading face 44 of pistons 404. In some applications ports 410 and 413 may be generally open except as the piston 404 moves past the valve 412.

FIG. 27 further illustrates a positive acting intake valve and an open exhaust port suitable for use with externally supplied non-compressible power source fluid such as hydraulic fluid in machines such as a hydraulic motor. Fluid is delivered to cylindrical cup 516 thence through ports 513 and passage 509 against the trailing face 46 of piston 504 and fluid from the previous cycle is driven through open exhaust port 505 by leading face 44 of piston 504.

It is readily apparent that cylindrical cup positive acting valve such as 400 and 411 may be used singularly or in pairs on a divider valve 412 as appropriate for a particular machine including the use as an exhaust or discharge valve when another type valve or open port is used for the machine fluid intake or supply location. Also the number of pistons and divider valves may be varied to other than that illustrated in FIG. 26.

Figure 28:
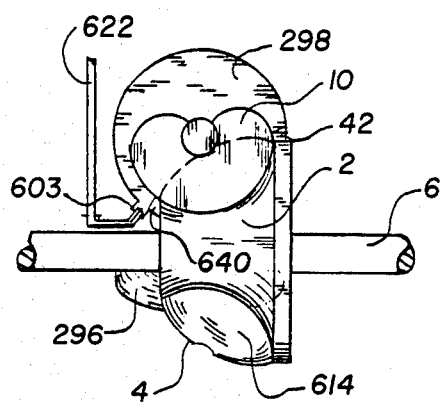
FIG. 28 is a diagrammatic view of a rotary engine.

FIG. 28 diagrammatically illustrates an internal combustion engine in which pressurized fluid is supplied to valve chamber 298 through manifold 622 and valve 603. This pressurized fluid may be from a source separate from the engine cycle or may be bled off the compression phase of the engine working cycle. This arrangement may be used without a discharge valve and manifold from chamber 298 as illustrated or may be supplied with discharge line and valve as illustrated in FIG. 19. The purpose of pressurized compression-expansion valve chamber 298 and divider valve chamber 300 is to create an intermediate pressure zone between the pressure in the working space 14 of the engine and the near atmospheric pressure to reduce possible leakage past seals on valves 10 and 12 between working space 14 and chambers 298 and 300.

Figure 29:
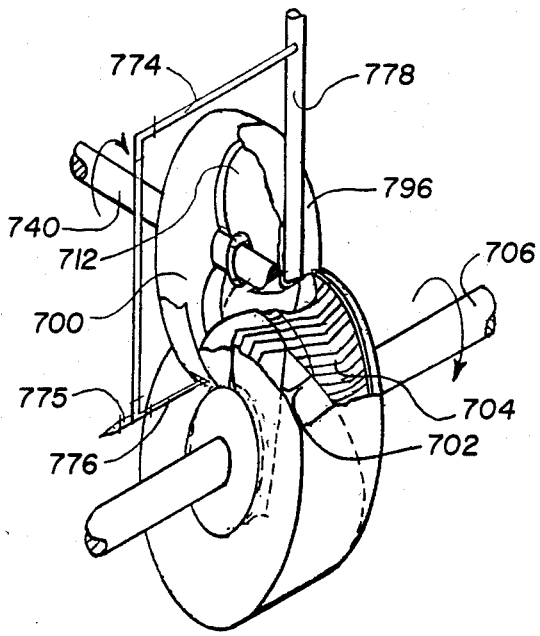
FIG. 29 is a diagrammatic view of a rotary machine.

As best illustrated in FIG. 29, an alternate rotary machine is preferably supplied with a compressible fluid under pressure from an external source to turn the rotor 702 and delivers useable power to the rotor shaft 706 such as for a pneumatic motor. The valve chamber 700 is pressurized by pressurized fluid diverted from that delivered to the working section of the machine by manifold 778. A pressure regulating valve 775 may be used in the line to pressurize chamber 700 to a lower pressure than the pressure in the working section of the machine. Pressurized fluid is delivered from manifold 778 to conduit 774, through pressure regulating valve 775 and passage 776 to chamber 700 to reduce possible leakage past the seals on valve 712 between chamber 700 and working space 714.

Illustrated in FIG. 30 is a similar rotary machine suitable for use such as a hydraulic motor when supplied with a non-compressible fluid under pressure from an external force to turn a rotor 802 to turn shaft 806. Valve housing 896 chamber 800 is pressurized through manifold 874 and pressure control valve 852 using fluid diverted from the machine fluid supply source. Fluid is discharged from chamber 800 through manifold 856 and outlet pressure control valve 854. This arrangement reduces the pumping effect of the notch in valve 812 and maintains the valve housing 896 at a pressure between atmospheric and the pressure of the operating fluid to reduce possible leakage.

This machine can also be used as a compressor pump or vacuum pump. In the compressor configuration the housing chamber 800 can be pressurized through manifold 874, using pressure from the machine discharge line. In this configuration the machine may be used without a discharge valve and manifold from housing 896. For vacuum pump use, the valve housing chamber 800 inlet valve 852 can be connected through manifold 874 to the suction side of the machine and the valve housing 896 may be operated without valved outlet 856. For pump use the housing 896 can be connected by valve 854 of manifold 856 to the discharge side from the working pump space 814.

The optional pressure regulating valve 875 will normally be appropriate for use in manifold 874 when the machine is used as a pump.

Illustrated in FIG. 31 is a machine similar to that in FIG. 30 except for less clearance between the valve 912 and valve housing 996 to allow work to be done by or on rotation of valve 912.

FIG. 31 illustrates an arrangement wherein the valve housing 996 may be of a minimal size such that clearance between the valve housing 996 and valve 912 is minimal and chamber 900 therefore of minimal volume. It is necessary to vent the housing 996 through outlet valve 954 and exhaust outlet 956 and allow intake through supply inlet 974 and inlet valve 952. The machine valve housing 996 configuration illustrated by FIG. 31 is suitable for machine applications heretofore described. Supply line 974, normally with a check or pressure control valve 952, is connected to housing 996 as is discharge check or pressure control valve 954 with discharge line 956 for substantially all machine applications. The source of supply fluid and disposition of discharged fluid is substantially as heretofore described. When this machine is used as a motor powered by a pressurized fluid from an external source, the part of this fluid diverted through supply line 974 to housing 996 chamber 900 acts on valve 912 causing it to produce torque to augment the torque produced by the rotor 902. When this machine is used as a compressor or pump, the valve 912 does work on the fluid diverted through housing 996 to increase the pressure differential of the leaving fluid over the entering fluid and in some applications may increase the output of the machine.

Figure 32:
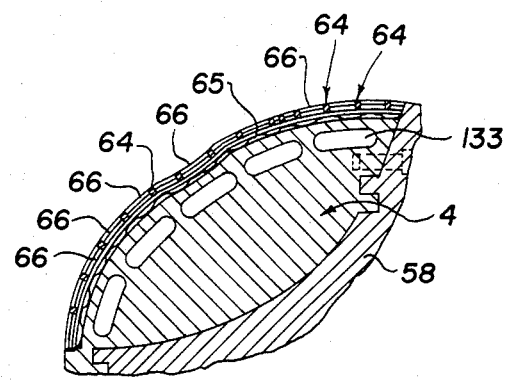
FIG. 32 is a partial cross-sectional view of a piston for the machine illustrated in FIGS. 30 and 31.

Illustrated in FIGS. 30–32 are examples of compact working space 814 and 914 cross-section configurations suitable for machines in which both the intake to and exhaust or discharge from a machine working space are located other than through the hub of a divider valve or compression-expansion valve. The working space cross section of all heretofore described machines may have one of a variety of cross sections; however, for machines as illustrated in FIGS. 30–32 an even larger selection of simplified working space cross sections may be used.

Having described my invention, I claim:

1. In a rotary machine: a rotor; a housing having a working space formed therein, said rotor being disposed in said working space; a shaft extending through said housing and rigidly secured to said rotor, said shaft being rotably supported by said housing; seal means on at least one end of said rotor, said seal means being formed by two facing members separated by a plurality of circular fins formed on at least one of the facing members and arranged with the ends of said fins formed on at least one facing member engaging the other facing member, the first facing member being formed on the end of the rotor, and the second facing member being non-rotatably but moveably secured and sealed to said housing; means on one of said facing members to rake the space between fins formed on the opposite facing member to dislodge foreign matter, said raking means consisting of a plurality of relatively short length circumferential teeth, each tooth formed in substantially the shape of the space between adjacent fins on the opposite facing member; and means to circulate flushing lubricant fluid adjacent to the leading end of said teeth to flush out collected loose foreign matter; and a thrust control means to position said facing members in sealing relation.

2. The combination called for in claim 1 in which a valve means is formed to interrupt said flushing lubricant flow during selected intervals of the machine cycle.

3. The combination called for in claim 1 with the addition of means to substantially prevent pressure blow-by around said fins through lubricant fluid passages.

4. A rotary machine comprising: a housing having a working space formed therein; a rotor in said working space and seal means between the rotor and the housing, said seal means being formed by two facing members separated by a plurality of circular fins formed on at least one of the facing members, said fins being arranged such that surfaces on said fins engage the other facing member, the first facing member being formed on the end of the rotor, and the second facing member being moveably secured to said housing; a thrust flange formed near the radially inward circumference of said second facing member; a double thrust bearing formed on the rotor and arranged to engage both sides of said thrust flange; and a bearing retainer means to secure said double thrust bearing to the rotor.

* * * * *